(12) United States Patent
Chang et al.

(10) Patent No.: US 8,745,206 B1
(45) Date of Patent: Jun. 3, 2014

(54) CONTENT MONITORING AND CONTROL TECHNOLOGY

(75) Inventors: Jack H. Chang, Saratoga, CA (US); William H. Sheu, Fremont, CA (US); Sherman Tuan, Cupertino, CA (US)

(73) Assignee: PurpleComm Inc., Santa Clara, CA (US)

( * ) Notice: Subject to any disclaimer, the term of this patent is extended or adjusted under 35 U.S.C. 154(b) by 649 days.

(21) Appl. No.: 12/795,379

(22) Filed: Jun. 7, 2010

(51) Int. Cl.
*G06F 15/16* (2006.01)

(52) U.S. Cl.
USPC ........... 709/224; 709/223; 709/225; 709/230; 709/231; 725/25; 725/34; 725/36; 725/44

(58) Field of Classification Search
USPC ................... 709/223, 224; 705/26.3, 14.2, 30
See application file for complete search history.

(56) References Cited

U.S. PATENT DOCUMENTS

| | | | | |
|---|---|---|---|---|
| 6,834,308 | B1 * | 12/2004 | Ikezoye et al. | 709/231 |
| 7,089,579 | B1 | 8/2006 | Mao et al. | |
| 7,225,456 | B2 | 5/2007 | Kitsukawa et al. | |
| 7,640,353 | B2 * | 12/2009 | Shen et al. | 709/231 |
| 7,873,638 | B2 * | 1/2011 | Young et al. | 707/736 |
| 8,266,659 | B2 * | 9/2012 | Urdang et al. | 725/88 |
| 2002/0184634 | A1 | 12/2002 | Cooper | |
| 2003/0110503 | A1 | 6/2003 | Perkes | |
| 2003/0221197 | A1 | 11/2003 | Fries et al. | |
| 2005/0021785 | A1 * | 1/2005 | Nakaji | 709/229 |
| 2005/0081244 | A1 | 4/2005 | Barrett et al. | |
| 2006/0075428 | A1 | 4/2006 | Farmer et al. | |
| 2007/0277219 | A1 | 11/2007 | Toebes et al. | |
| 2008/0022320 | A1 | 1/2008 | Ver Steeg | |
| 2008/0115182 | A1 | 5/2008 | Van Willigenburg | |
| 2008/0201311 | A1 * | 8/2008 | Ertugrul et al. | 707/4 |
| 2008/0256218 | A1 * | 10/2008 | Kinoshita et al. | 709/219 |
| 2008/0320513 | A1 * | 12/2008 | Wong et al. | 725/38 |
| 2010/0121744 | A1 * | 5/2010 | Belz et al. | 705/30 |

FOREIGN PATENT DOCUMENTS

WO WO2006041784 A2 4/2006

OTHER PUBLICATIONS http://www.snapstream.com/enterprise/webplayer.asp "Introducing TV Monitoring for the Multi-Tasker"—Snapstream, Sep. 2008.*
http://citeseerx.ist.psu.edu/viewdoc/download?doi=10.1.1.104. 8454&rep=rep1&type=pdf "Personalized Contents Guide and Browsing based on User Preference"—Aug. 2005, PSU.*

* cited by examiner

*Primary Examiner* — Randy Scott
(74) *Attorney, Agent, or Firm* — Fish & Richardson P.C.

(57) ABSTRACT

Content monitoring and control technology, in which content download activity, content playing activity, and/or remote control activity of a media system is monitored. Data descriptive of use of the media system is tracked based on the monitoring of the content download activity, the content playing activity, and/or the remote control activity. One or more operations are performed based on the tracked data descriptive of use of the media system.

22 Claims, 19 Drawing Sheets

| 606 | 608 | 610 | 612 | 614 | 616 |
|---|---|---|---|---|---|
| Status | File Name | Size | Finished Time | Lapsed | Start Time |
| Complete | File1.m4v | 120.2 MB | 07-20 1:33:16 | 00:30:12 | 07-20 1:03:04 |
| In-Progress | File2.m4v | 37.3 MB | | 00:10:11 | 07-20 2:03:20 |

600

602 → Complete row
604 → In-Progress row

FIG. 6

| | Player ID ⌐810 | Content ID ⌐812 | Command ⌐814 | Start Time ⌐816 | End Time ⌐818 |
|---|---|---|---|---|---|
| 802 | 234567 | 654123 | Play | 06-22 1:02:11 | 06-22 1:02:19 |
| 804 | 234567 | 654123 | Stop | 06-22 1:02:19 | |
| 806 | 234567 | 654123 | RWD | 06-22 4:55:12 | 06-22 4:56:22 |
| 808 | 234567 | 654123 | FWD | 06-22 2:20:11 | 06-22 2:20:19 |
| 809 | 234567 | 655227 | Play-Streaming | 6-23 3:48:19 | 6-23 4:48:11 |

| Remote ID | Channel ID | Content ID | Action | Start Time | End Time |
|---|---|---|---|---|---|
| 234567 | 1 | 654123 | Play | 06-22 1:03:13 | |
| 234567 | 1 | 654123 | Stop | 06-22 1:03:29 | |
| 234567 | | | CALL | 06-22 1:04:14 | 06-22 1:04:19 |
| 234563 | | | Login | 06-22 1:05:11 | |
| 234563 | 2 | | Browse Channel | 06-22 1:05:11 | 06-22 1:05:21 |
| 234563 | 2 | 654135 | Preview | 06-22 1:05:21 | 06-22 1:05:22 |
| 234563 | 2 | 654135 | FWD | 06-22 1:05:22 | 06-22 1:05:23 |
| 234563 | | | Browse Genre | 06-22 1:05:25 | 06-22 1:05:28 |

FIG. 10

CONTENT MONITORING AND CONTROL TECHNOLOGY

FIELD

The present disclosure generally relates to content monitoring and control technology.

BACKGROUND

Content viewers today are exposed to an overwhelming amount of information and are challenged by the degree of interaction and personalization needed to manage this massive amount of information. In an era of digital communications, a user may be confused by an array of technology including traditional analog televisions, DVRs (Digital Video Recorders), PVRs (Personal Video Recorders), media centers, EPG (Electronic Program Guide)-based systems, Internet-related content, and traditional remote control devices.

SUMMARY

In one aspect, a method includes monitoring content download activity, content playing activity, and remote control activity of a media system that leverages a content delivery network in controlling content delivered to the media system. The method also includes tracking data descriptive of use of the media system based on the monitoring of the content download activity, the content playing activity, and the remote control activity. The method further includes performing, using a computer, one or more operations related to at least one of the media system and the content delivery network based on the tracked data descriptive of use of the media system.

Implementations may include one or more of the following features. For example, the method may include identifying a content file being downloaded by a downloader device included in the media system, identifying a size of the content file being downloaded, and monitoring status of the download including timing data related to start and completion of the download. In this example, the method may include generating a download detail record based on the identified content file, the identified size, and the monitored status of the download and storing the download detail record.

In some implementations, the method may include identifying a content identifier of a content file being played by a media player included in the media system, identifying a media player identifier for the media player included in the media system, and monitoring commands controlling playing of the content file by the media player and timing data associated with the commands. In these implementations, the method may include generating a play detail record based on the content identifier, the media player identifier, and the monitored commands and timing data and storing the play detail record. In addition, the method may include determining a digital fingerprint of the content file being played by the media player and using the digital fingerprint to determine the content identifier of the content file.

In some examples, the method may include detecting an action taken by a remote control that controls operation of the media system, identifying a remote control identifier for the remote control that controls operation of the media system, and determining timing data related to the action taken by the remote control. In these examples, the method may include generating a remote control detail record based on the detected action, the remote control identifier, and the determined timing data and storing the remote control detail record.

In addition, the method may include identifying a channel identifier for a channel associated with the action taken by the remote control and generating a remote control detail record based on the detected action, the remote control identifier, the channel identifier, and the determined timing data. Also, the method may include identifying a content identifier for content associated with the action taken by the remote control and generating a remote control detail record based on the detected action, the remote control identifier, the content identifier, and the determined timing data.

Further, the method may include aggregating tracked activity data for multiple, different media systems that leverage the content delivery network and analyzing the aggregated activity data to detect activity patterns of the multiple, different media systems. The method also may include determining one or more operations related to the content delivery network based on one or more detected activity patterns and performing the determined one or more operations related to the content delivery network.

In some examples, the method may include aggregating tracked activity data for the media system that leverages the content delivery network, analyzing the aggregated activity data to detect activity patterns of the media system, determining one or more operations related to the media system based on one or more detected activity patterns, and performing the determined one or more operations related to the media system. In these examples, the method may include determining a channel to recommend to a user of the media system based on one or more detected activity patterns and recommending the channel to the user of the media system. Also, in these examples, the method may include determining an advertisement to provide to a user of the media system based on one or more detected activity patterns and providing the advertisement to the user of the media system.

In some implementations, the method may include accessing tracked content download activity data, accessing tracked content playing activity data, accessing tracked remote control activity data, and analyzing a combination of the tracked content download activity data, the tracked content playing activity data, and the tracked remote control activity data to detect activity patterns. In these implementations, the method may include determining one or more operations based on one or more activity patterns detected by analyzing the combination of tracked data and performing the determined one or more operations.

Further, the method may include accessing tracked content download activity data, accessing tracked content playing activity data, and analyzing a combination of the tracked content download activity data and the tracked content playing activity data to detect activity patterns. The method also may include determining one or more operations based on one or more activity patterns detected by analyzing the combination of tracked data and performing the determined one or more operations.

In addition, the method may include accessing tracked content download activity data, accessing tracked remote control activity data, and analyzing a combination of the tracked content download activity data and the tracked remote control activity data to detect activity patterns. The method also may include determining one or more operations based on one or more activity patterns detected by analyzing the combination of tracked data and performing the determined one or more operations.

In some examples, the method may include accessing tracked content playing activity data, accessing tracked remote control activity data, and analyzing a combination of the tracked content playing activity data and the tracked remote control activity data to detect activity patterns. In these examples, the method may include determining one or more operations based on one or more activity patterns detected by analyzing the combination of tracked data and performing the determined one or more operations.

In some implementations, the method may include accessing tracked content download activity data and analyzing the tracked content download activity data to detect content download patterns. In these implementations, the method may include determining one or more operations based on one or more content download patterns detected by analyzing the tracked content download activity data and performing the determined one or more operations.

The method may include accessing tracked content playing activity data and analyzing the tracked content playing activity data to detect content playing patterns. The method may include determining one or more operations based on one or more content playing patterns detected by analyzing the tracked content playing activity data and performing the determined one or more operations.

Also, the method may include accessing tracked remote control activity data and analyzing the tracked remote control activity data to detect remote control usage patterns. The method further may include determining one or more operations based on one or more remote control usage patterns detected by analyzing the tracked remote control activity data and performing the determined one or more operations.

In addition, the method may include performing one or more operations related to the media system based on the tracked data descriptive of use of the media system. The method also may include performing one or more operations related to the content delivery network based on the tracked data descriptive of use of the media system.

In some examples, the method may include monitoring advertisement content download activity, advertisement content playing activity, and remote control activity related to advertisement content. In these examples, the method may include tracking data descriptive of use of the media system related to advertisement content based on the advertisement content download activity, the advertisement content playing activity, and the remote control activity related to advertisement content. Further, in these examples, the method may include identifying advertisements to provide to the media system based on the tracked data descriptive of use of the media system related to advertisement content.

In one aspect, a system includes at least one computer and at least one computer-readable medium coupled to the at least one computer having instructions stored thereon which, when executed by the at least one computer, causes the at least one computer to perform operations. The operations include monitoring content download activity, content playing activity, and remote control activity of a media system that leverages a content delivery network in controlling content delivered to the media system. The operations also include tracking data descriptive of use of the media system based on the monitoring of the content download activity, the content playing activity, and the remote control activity. The operations further include performing, using a computer, one or more operations related to at least one of the media system and the content delivery network based on the tracked data descriptive of use of the media system.

In yet another aspect, at least one computer-readable storage medium is encoded with at least one computer program comprising instructions that, when executed, operate to cause a processor to perform operations. The operations include monitoring content download activity, content playing activity, and remote control activity of a media system that leverages a content delivery network in controlling content delivered to the media system. The operations also include tracking data descriptive of use of the media system based on the monitoring of the content download activity, the content playing activity, and the remote control activity. The operations further include performing, using a computer, one or more operations related to at least one of the media system and the content delivery network based on the tracked data descriptive of use of the media system.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 6 is a diagram illustrating example download detail records.

FIG. 8 is a diagram illustrating example play detail records.

FIG. 10 is a diagram illustrating example remote-control detail records.

Like reference numbers represent corresponding parts throughout.

DETAILED DESCRIPTION

Figure 1:
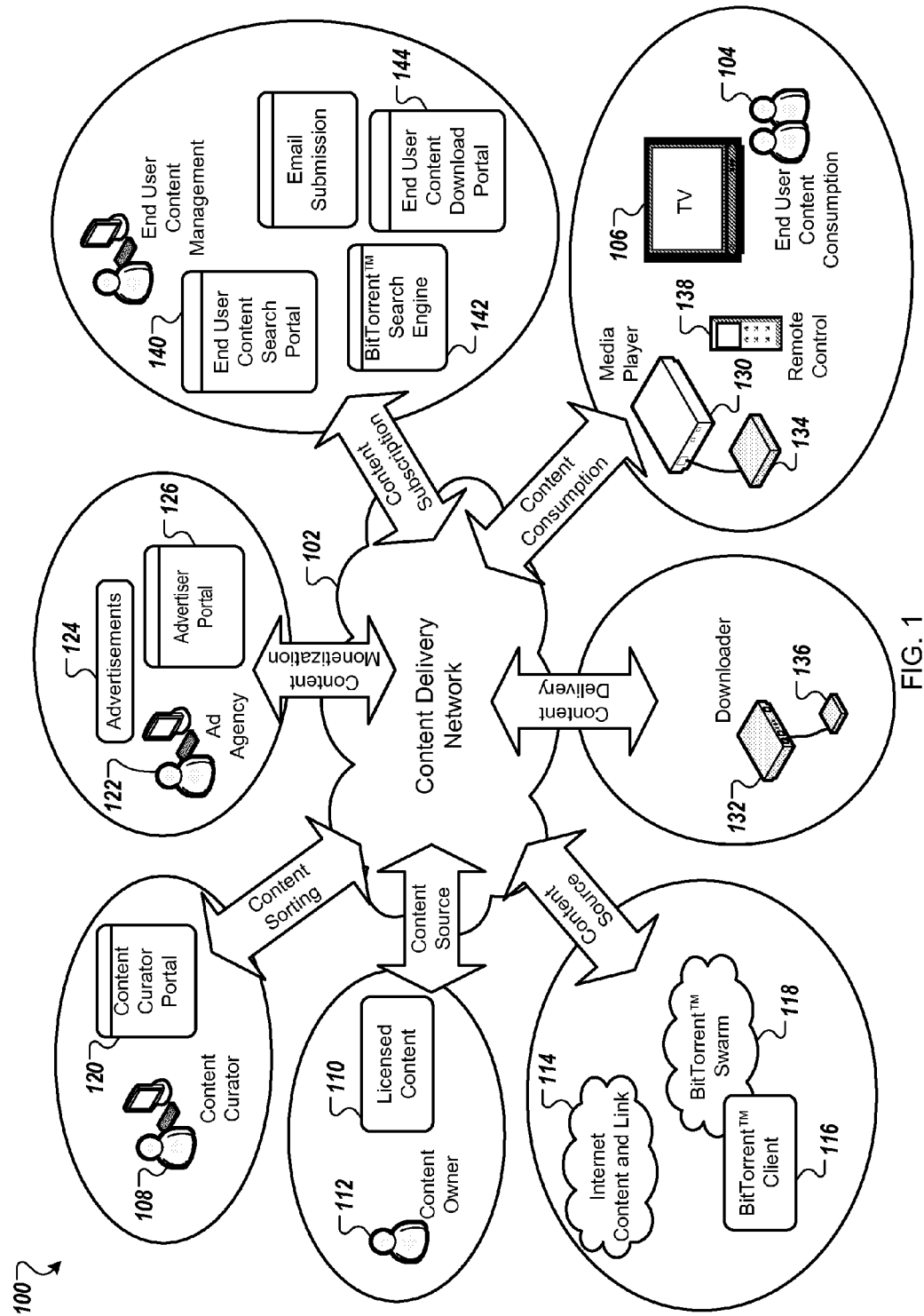
FIGS. 1, 2, 3, 18, and 19 are diagrams of exemplary systems.

FIG. 1 illustrates a content delivery system 100. The system 100 provides support for various aspects of content delivery, such as content sourcing, content sorting, content monetization, content subscription, content download, and content consumption. The content delivery system 100 includes a content delivery network 102. The content delivery network 102 may be one or more public or private, wired or wireless networks, such as the Internet or a Session Initiated Protocol (SIP) network such as the PsipTN™ network offered by TelTel™. Using the system 100, end users 104 may view channels, for example, on a television 106 located in their home. Channels may be defined by end users 104, or by "content curators" 108.

Multiple types of content, such as audio (e.g., music, podcasts), video, and still images (e.g., photographs), may be made available over the content delivery network 102. Licensed and license-free content may be made available. For example, licensed content 110 may be acquired from a content owner 112.

Content may be made available from a variety of sources. For example, Internet content may be accessed from an Internet link 114 (e.g., URL (Uniform Resource Locator)). Content may also be accessed from peer-to-peer networks. For example, content may be accessed from one or more BitTorrent™ clients 116 which are part of one or more BitTorrent™ "swarms" 118. Content may be accessed from other sources, such as from a television broadcast (e.g., MSO (Multiple System Operator), cable, satellite, local) or from content (e.g., photographs, audio, previously recorded video) available from devices (e.g., DVR, stereo, computer, DVD (Digital Video Disc) player) connected to a user's home network and/or located in a user's home.

Content curators 108 may use a content curator portal 120 to define custom channels which may be made available for subscription by end users 104. The content curators 108 may be commissioned to search for, select, and organize multiple types of content from various sources into channels. Content curators 108 may, for example, organize channels by topic or genre. Content curators 108 may, for example, select licensed content, license-free content, BitTorrent™ content, or content from their private collection, to name a few examples.

Channels may be offered for free to end users 104 or end users 104 may subscribe to channels on a fee basis. Users may rate or rank channels or content curators based, for example, on programming selection, sequencing, and quality. Content curators 108 may be promoted, for example, based on popularity.

Content owners 112 may be compensated for the use of licensed content 110 that they own which is used in channels defined by content curators 108. For example, the system 100 may provide support for digital rights management (DRM). By allowing access to their licensed content 110, content owners 112 may experience increased distribution and revenue and targeted exposure in focused channels. Multiple revenue agreements may be possible, such as per-use agreements, subscription revenue sharing, and advertisement revenue sharing.

A content curator 108 may work with one or more advertisers 122, such as an ad agency, to include advertisements 124 on a channel. For example, an advertisement may be displayed if a user switches a channel or when a program finishes. As another example, advertisements may be displayed on the display of a remote control device, such as while a program is being displayed on a television. Content curators 108, advertisers 122, and content owners 112 may share advertising revenue. Sharing in advertising revenue may provide an incentive for content curators 108 to create interesting and popular channels. A content curator 108 may work with one or more advertisers 122 to create one or more advertisements 124 which are customized and targeted for one or more particular channels. End users 104 may customize advertisement viewing preferences, such as by specifying preferred topics, preferred or excluded companies, region preferences, etc.

Advertisers 122 may use an advertiser portal 126 to upload advertisements 124 and to control advertisement publication. Advertisers 122 may define and apply advertisement insertion rules to particular advertisements 124 and/or may allow a content curator 108 to decide when and how to insert the advertisements 124 into channels defined by the content curator 108. APIs (Application Programming Interfaces) may be provided which allow advertisers 122 to enable the system 100 to interface with standard advertisement inventory management systems to allow for control and management of advertisements 124. Various advertisement pricing plans may be supported, such as individually-priced ads or bulk pricing. Other advertising features may be included, such as online purchasing of items or providing customer contact options.

Advertisers 122, content curators 108, and content owners 112 may access user viewing behavior data. Advertisers 122 may access user viewing behavior data, such as viewed channels, viewed content, viewed advertisements, advertisement display frequency, advertisement viewed length, user actions during advertisement display, user characteristics, advertisement and content view times, advertisement and content view counts, and hosting channel information, to monitor reach and performance of advertising campaigns. Advertisements may be targeted to specific users based on recorded user viewing behavior data. Content curators 108 may access user viewing behavior data to learn about behaviors of end users 104 who subscribe to their channels. Content owners 112 may access user viewing behavior data to learn about their fan base, such as accessing information about user demographics, time of day of access, and user actions during content display. Content presentation and playback may be customized and personalized for a particular end user 104, based specifically on recorded user viewing behavior of the particular end user 104 and generally on recorded user viewing behavior of all users.

User viewing behavior data may be captured, for example, by a media player 130 and/or a downloader device 132. The media player 130 and/or the downloader device 132 may play content included or ordered on a channel defined by a content curator 108. In some implementations, the media player 130 may play content downloaded from the content delivery network 102 by the downloader device 132. In some implementations, the media player 130 and the downloader device 132 are different logical functions of the same physical device. In other implementations, the media player 130 and the downloader device 132 are different physical devices. In some implementations, the media player 130 is a software application which may be executed, for example, on a computing device such as a desktop or laptop computer.

The media player 130 and/or the downloader device 132 may be connected to external media storage devices 134, 136 respectively. The external media storage devices 134, 136 may be, for example, USB (Universal Serial Bus) drives. The external media storage devices 134,136 may be used, for example, to transfer data to/from the media player 130 or the downloader device 132, respectively, such as to transfer data to/from a computing device.

The media player 130 and/or the downloader device 132 may communicate wirelessly with one or more remote control devices 138. The end user 104 may navigate through channels and perform other functions using the remote control device 138. The remote control device 138 may communicate (e.g., using Infrared (IR) technology of radio frequency (RF) technology) with the television 106, the media player 130, and/or the downloader device 132. The remote control device 138 also may communicate over a network with the media player 130 and/or the downloader device 132 to control functions of the media player 130 or the downloader device 132. The remote control device 138 may include a small display screen that displays preview content and/or advertisements.

The media player 130 and/or the downloader device 132 may download content from the content delivery network 102 without consuming resources of a computing device owned by the end user 104. For example, content may be downloaded into the home of an end user 104 without using resources of a personal computer owned by the end user 104. The media player 130 and the downloader device 132 may use less electricity than a personal computer, thus reducing the electric bill of the end user 104. The media player 130 and/or the downloader device 132 may connect to other computing devices connected on a user's home network. The media player 130 and/or the downloader device 132 may include built-in functionality to communicate with and download information from a peer-to-peer network, such as the BitTorrent™ swarm 118.

The end user 104 may search for and subscribe to content using an end-user content search portal 140. For example, the end-user content search portal 140 may provide a directory listing of available defined channels. The directory listing may be organized in a hierarchy of categories and sub-categories. A particular channel may appear in one or more categories or sub-categories. The end-user content search portal 140 may also provide a search function to allow end users to search for available defined channels based on a keyword search. As another example, users may search for channels based on other criteria, such as sorting channels based on channel or content curator popularity or ranking. An end user may subscribe to a defined channel, for example, by selecting a channel link displayed in a directory listing or in a list of search results.

The end user 104 may also search for and initiate download of individual content items to the downloader device 132 using a partner site such as a BitTorrent™ search engine 142. As another example, the end user 104 may send an email which includes a content link to an email address associated with their downloader device 132 to initiate an automatic download to the downloader device 132 of the content linked to by the content link. The content link may refer to a content file available on the Internet, and may be a reference to a video resource available from a streaming video website. The end user 104 may send an email with an attachment to an email address associated with the downloader device 132, to initiate a download of the attachment to the downloader device 132. The end user 104 may use an end-user content download portal 144 to search for and to select content to download to the downloader device 132.

Figure 2:
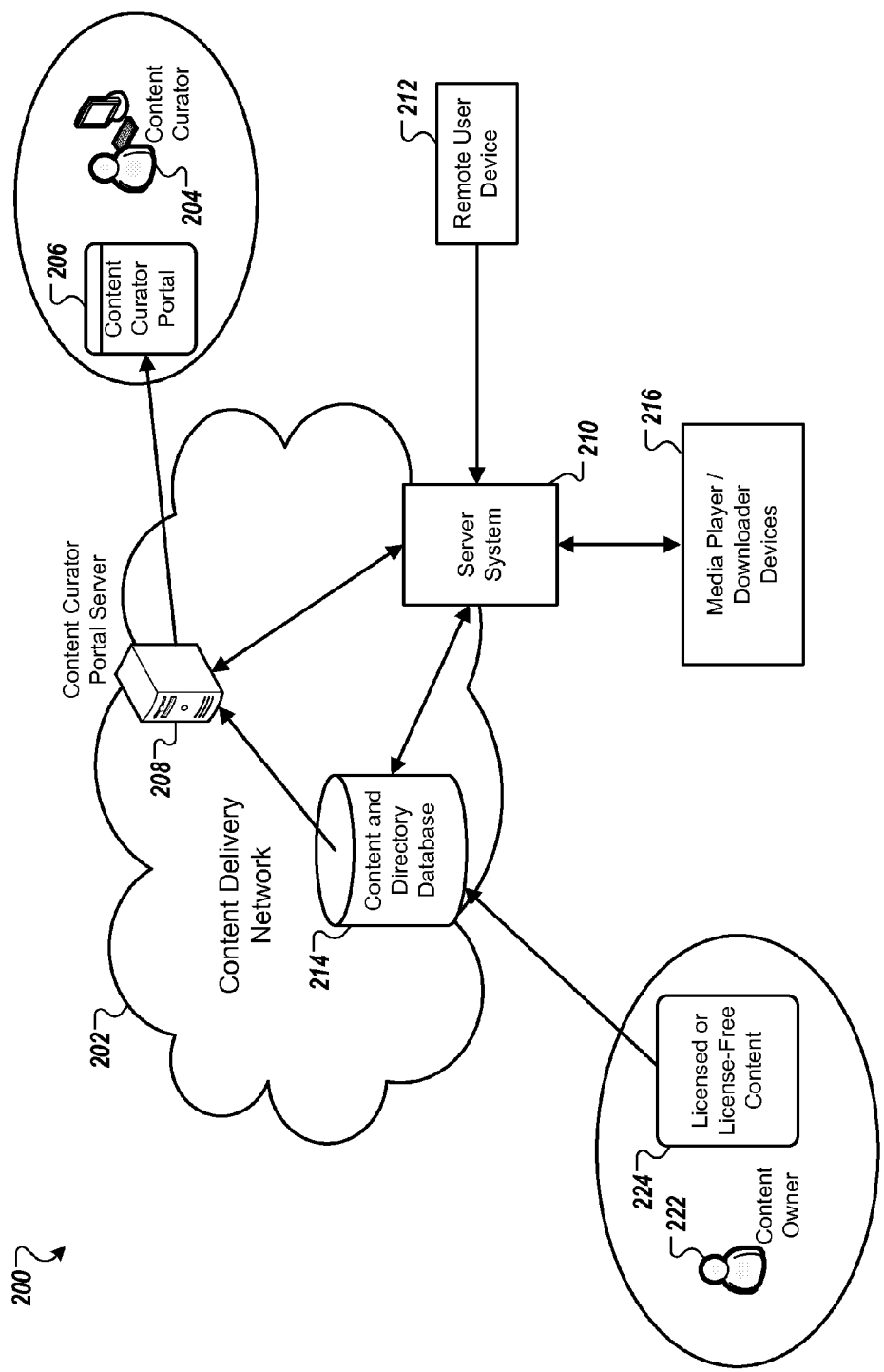

FIG. 2 illustrates a system 200 for content sourcing and download over a content delivery network 202. Licensed or license-free content 204 is acquired from one or more content owners 206 or from a publicly available source, such as the Internet. For example, content owners 206 may transfer content over the content delivery network 202 to a content and directory database 208. Content may also be transferred to the content and directory database 208 from a server system 210, such as using a DVD or CD (Compact Disc) drive. License-free content, such as license-free video or podcasts, may be downloaded from the Internet and stored in the content and directory database 208. In some implementations, some or all content may be stored in the content and directory database 208 as BLOBs (Binary Large Objects). In some implementations, some or all content may be stored in the file system of the server system 210 and references to file system locations may be stored in the content and directory database 208.

The content and directory database 208 stores information about content and also information about defined channels. Download jockeys 212 may use a download jockey portal 214 to define channels and to manage defined channels. The download jockey portal 214 may display a listing of licensed and license-free content available in the content and directory database 208. The download jockey portal 214 may also provide a search function which allows the download jockey 212 to search for content available in the content and directory database 208 and to also search for content included in the private collection of the content curator 212 or content available on the Internet, such as content available from peer-to-peer networks, such as BitTorrent™.

The download jockey portal 214 may communicate with a download jockey server 216. For example, a channel definition defined using the download jockey portal 214 may be sent to the download jockey server 216, which may communicate with the server system 210 to request that the channel definition be stored in the content and directory database 208. As another example, information for existing channel definitions associated with a particular download jockey 212 may be retrieved from the content and directory database 208 and sent from the download jockey portal server 216 to the download jockey portal 214 for display.

In some implementations, the download jockey portal server 216 is one physical server computing device and in other implementations, the download jockey portal server 216 includes multiple physical server computing devices. Similarly, in some implementations, the server system 210 is one physical server computing device, and in other implantations, the server system 210 includes multiple physical server computing devices. In some implementations, multiple physical server computing devices are used, with some or all server computing devices implementing both the download jockey portal server 216 and the server system 210. In some implementations, one physical server computing device is used, with the one physical server device implementing both the download jockey portal server 216 and the server system 210.

The network 202 may be one or more public or private, wired or wireless networks, such as the Internet, or may be a Session Initiated Protocol (SIP) network such as the PsipTN™ network offered by TelTel™. The network 202 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. The network 202 may include multiple networks or subnetworks, each of which may include, for example, a wired or wireless data pathway.

Content may be downloaded or streamed to one or more user media player/downloader devices 218. For example, content corresponding to a user-subscribed channel may be automatically downloaded or streamed to the media player/downloader device 218, in response to a user selection of a corresponding channel. As another example, a user may search for and download or stream content to the media player/downloader device 218. A user may, using a remote user device 220, monitor and manage user-initiated downloads. The remote user device 220 may be any type of electronic device configured to exchange communications with the server system 210 over a network. The remote user device 220 may be a general-purpose computer (e.g., a desktop personal computer, a workstation, or a laptop computer), a mobile or wireless device, or a device designed for a specific function (e.g., a cell phone, a smart phone, a tablet PC, a personal digital assistant (PDA), etc.).

Figure 3:
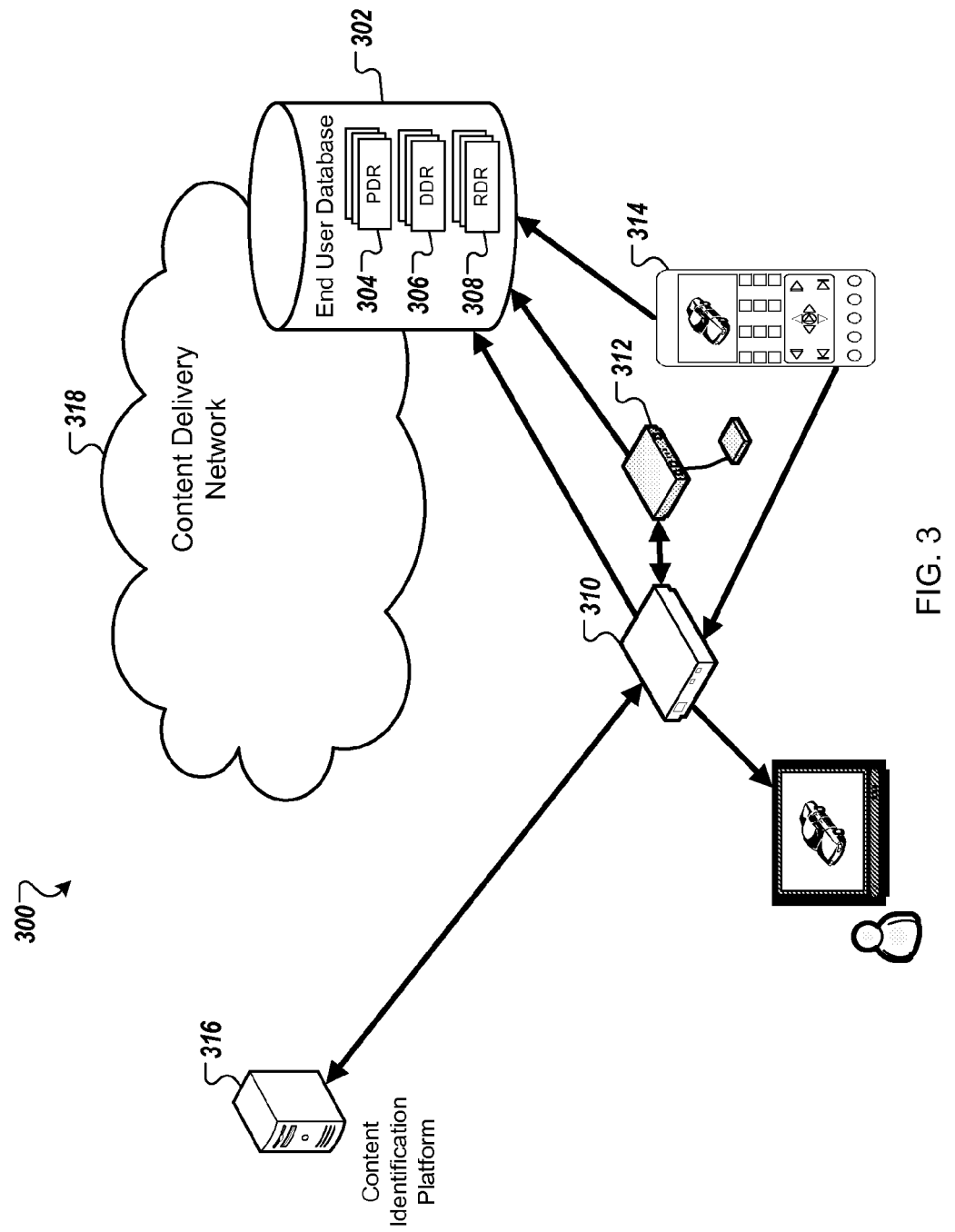

FIG. 3 illustrates an example system 300 for content delivery. An end user database 302 may be used to store one or more play detail records (PDRs) 304, one or more download detail records (DDRB) 306, and one or more remote-control detail records (RDRs) 308. A PDR 304 stores information about a user's content viewing activities (including viewing activity of downloaded or streamed content) performed using a media player device 310. A DDR 306 stores information about a user's download activities performed using a downloader device 312. As mentioned above, the media player device 310 and the downloader device 312 may be different logical functions of the same physical device. A RDR 308 stores information about a user's activities performed using a remote control device 314. PDR 304, DDR 306, and RDR 308 may store records of entertainment content activity and advertisement content activity. Any of the techniques described throughout this disclosure as applying to content may apply to entertainment content as well as advertisement content.

A PDR 304, DDR 306, and RDR 308 may include a content file name or identifier to identify a content file associated with a particular action (e.g., play content, download content, preview content). In some implementations, a content identification platform 316 may be used to identify content. For example, the media player device 310 may generate a digital signature of a content file and may send the digital signature to the content identification platform 316 over a content delivery network 318. The content identification platform 316 may compare the digital signature to digital signatures of known content files. If the content identification platform 316 finds a digital signature of a known content file that matches the received digital signature, the content identification platform 316 may send a corresponding content title to the media player device 310.

The remote control device 314 may be, for example, a television remote control, a mobile telephone, and/or may be or include a component of a personal computer (PC) or gaming system, a laptop, a handheld or tablet computer, a personal data assistant ("FDA"), a portable music player, a beeper or other communication device, or a handheld or portable electronic device for gaming, communications, and/or data organization.

Figure 4:
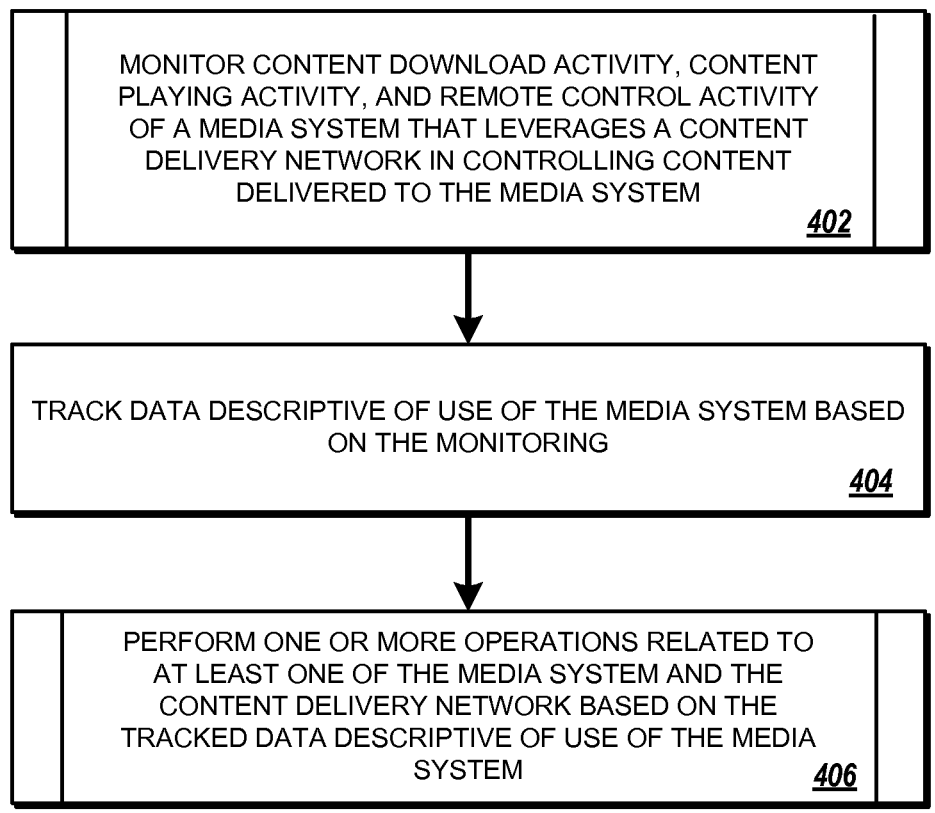
FIGS. 4, 5, 7, 9, 11, 13, 15, and 17 are flowcharts of exemplary processes.

FIG. 4 illustrates a process 400 for performing operations based on tracked data descriptive of use of a media system. The operations of the process 400 are described generally as being performed by the system 200. The operations of the process 400 may be performed by one of the components of the system 200 (e.g., the server system 210) or may be performed by a combination of the components of the system 200. In some implementations, operations of the process 400 may be performed by one or more processors included in one or more electronic devices.

The system 200 monitors content download activity, content playing activity, and remote control activity of a media system that leverages a content delivery network in controlling content delivered to the media system (402). For example and in reference to FIG. 3, the system 200 may monitor content download activity performed using the downloader device 312, content playing activity performed using the media player device 310, and remote control activity performed using the remote control 314.

Content download activity may be stored in a DDR. Content download activity may include for example, the downloading of a content file to a media player/downloader device, such as the downloading of a content file included in a channel or the downloading of a podcast or other content using RSS (Real Simple Syndication) technology. Generating a DDR is described in more detail below with respect to FIG. 5.

Figure 5:
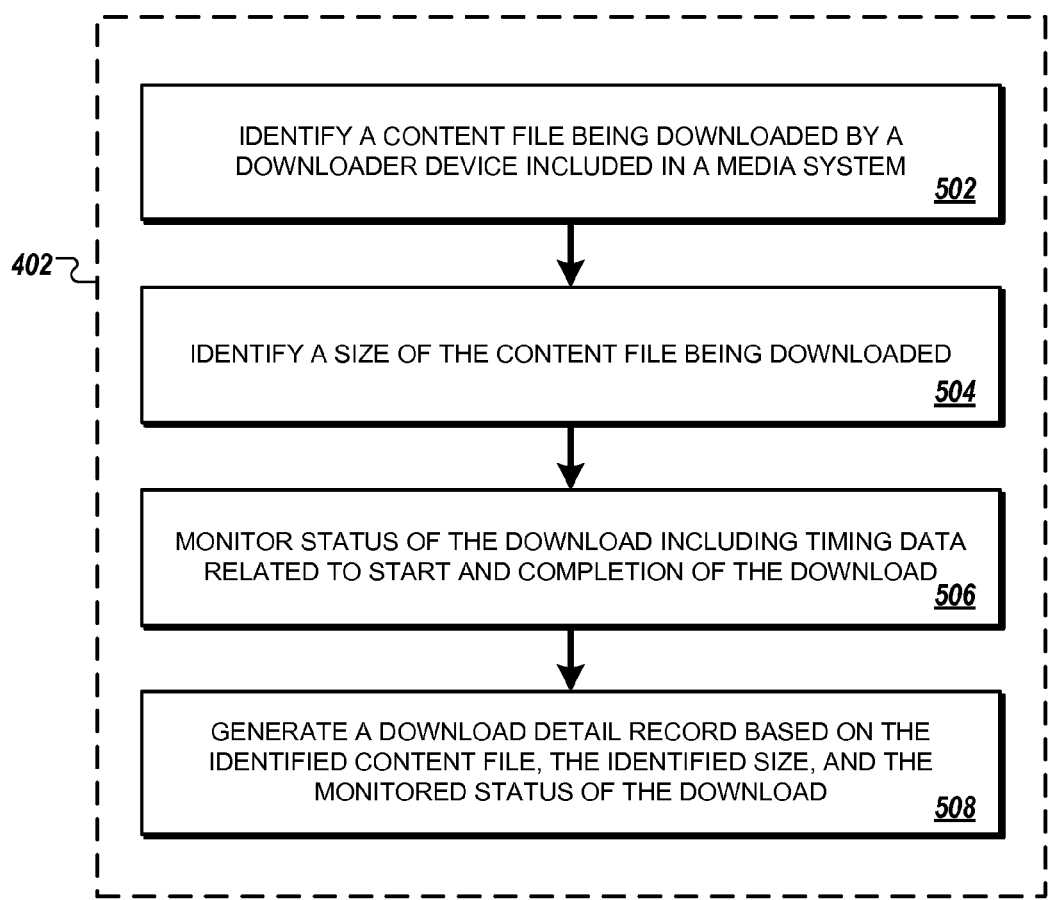

FIG. 5 illustrates a process 500 for generating a DDR. The process 500 may be used in monitoring content download activity of a media system referenced above with respect to reference numeral 402. The operations of the process 500 are described generally as being performed by the system 200. The operations of the process 500 may be performed by one of the components of the system 200 (e.g., the server system 210) or may be performed by a combination of the components of the system 200. In some implementations, operations of the process 500 may be performed by one or more processors included in one or more electronic devices.

The system 200 identifies a content file being downloaded by a downloader device included in a media system (502). A content file may be identified, for example, by a content file name (e.g., title), and/or by a content file identifier. A content file title may be identified using a content identification platform (e.g., platform 316, FIG. 3) that compares a digital signature of the content file to digital signatures of known content files.

The system 200 identifies a size of the content file being downloaded (504). The size of a content file may be the size that the content file occupies in storage. The size may be determined, for example, by querying metadata associated with the file. The size may also be determined by querying a database system for the size of database content associated with the content file or by querying a file system for a file attribute which indicates the size of the content file. As another example, the size of the content file may be computed by processing the file.

The system 200 monitors status of the download, including timing data related to start and completion of the download (506). For example, a download status may be maintained, with possible status values including, for example, completed, aborted, and in-progress. A timestamp may be recorded, for example, when a download starts, when a download completes, and when a download is abandoned or halted.

The system 200 generates a download detail record based on the identified content file, the identified size, and the monitored status of the download (508). FIG. 6 illustrates an example table 600 of example DDRs 602 and 604. Each DDR 602 and 604 includes the following fields: status 606, file name 608, size 610, finished time 612, lapsed time 614, and start time 616. Each DDR 602 and 604 may include a value for each of the fields 606, 608, 610, 612, 614, and 616 (for some DDRs, some of the fields 606, 608, 610, 612, 614, and 616 may be empty, or NULL). The DDR 602 indicates that a download of file "File1.m4v" of size one hundred twenty and two tenths megabytes (MB) began on July twentieth, at 1:03:04, and finished thirty minutes and twelve seconds later, at 1:33:16. The DDR 604 indicates that a download of the file "File2.m4v" of size thirty seven and three tenths MB began on July twentieth at 1:03:20 and that the download is still in progress with a last-recorded lapsed time of ten minutes eleven seconds.

Content playing activity may be stored in a PDR. Generating a PDR is described in more detail below with respect to FIG. 7.

Figure 7:
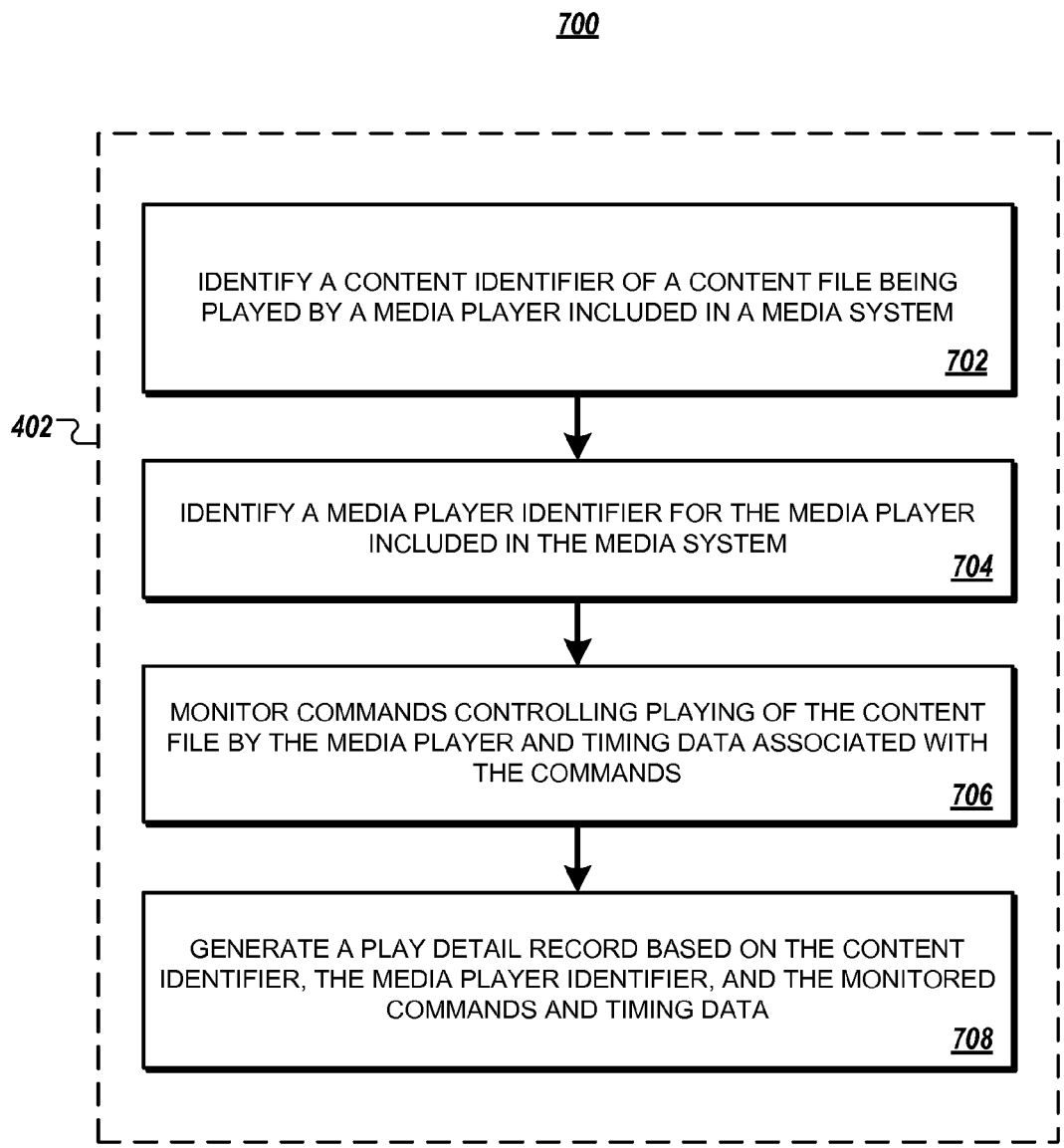

FIG. 7 illustrates a process 700 for generating a PDR. The process 700 may be used in monitoring content playing activity of a media system referenced above with respect to reference numeral 402. The operations of the process 700 are described generally as being performed by the system 200. The operations of the process 700 may be performed by one of the components of the system 200 (e.g., the server system 210) or may be performed by a combination of the components of the system 200. In some implementations, operations of the process 700 may be performed by one or more processors included in one or more electronic devices.

The system 200 identifies a content identifier of a content file being played by a media player/downloader device included in a media system (702). A content file may be identified, for example, by a content file name (e.g., title), and/or by a content file identifier. A content file title may be identified using a content identification platform (e.g., platform 316, FIG. 3) that compares a digital signature of the content file to digital signatures of known content files.

The system 200 identifies a media player identifier for the media player/downloader device included in the media system (704). For example, the media player/downloader device may retrieve a media player identifier identifying the media player/downloader device from electronic storage of the media player/downloader device. As another example, a media player identifier may be retrieved from a database external to the media player/downloader device.

The system 200 monitors commands controlling playing of the content file by the media player/downloader device and timing data associated with the commands (706). For example, the media player/downloader device may record, in response to actions such as play, stop, fast forward, rewind, or genre browse, an indicator of the action and a timestamp of the action.

The system 200 generates a play detail record based on the content identifier, the media player identifier, and the monitored commands and timing data (708). FIG. 8 illustrates an example table 800 of example PDRs 802, 804, 806, 808 and 809. Each PDR 802, 804, 806, 808 and 809 includes the following fields: player identifier 810, content identifier 812, command 814, start time 816, and end time 818. Each PDR 802, 804, 806, 808 and 809 may include a value for each of the fields 810, 812, 814, 816, and 818 (for some PDRs, some of the fields 810, 812, 814, 816, and 818 may be empty, or NULL).

The PDR 802 indicates that a content file with identifier "654123" was played on June twenty second, from time 1:02:11 to 1:02:19, on a media player/downloader device with identifier "234567". In some implementations, the PDR 804 may also be stored, in addition to the PDR 802. The PDR 804 indicates that playing of the content file with identifier "654123" was stopped, on the media player/downloader device with identifier "234567", at 1:02:19 on June twenty second. The PDR 808 indicates that the content file with identifier "654123" was "fast-forwarded" on June twenty second, starting at time 2:20:11 and ending at time 2:20:19, on the media player/downloader device with identifier "234567". The PDR 806 indicates that the content file with identifier "654123" was rewound on June twenty second, starting at 4:55:12 and ending at time 4:56:22, on the media player/downloader device with identifier "234567". The PDR 809 indicates that a streaming content file with identifier "655227" was played on June twenty third, starting at time 3:48:19 and ending at time 4:48:11, on the media player/downloader device with identifier "234567".

Remote control activity may be stored in a RDR. Generating a RDR is described in more detail below with respect to FIG. 9.

Figure 9:
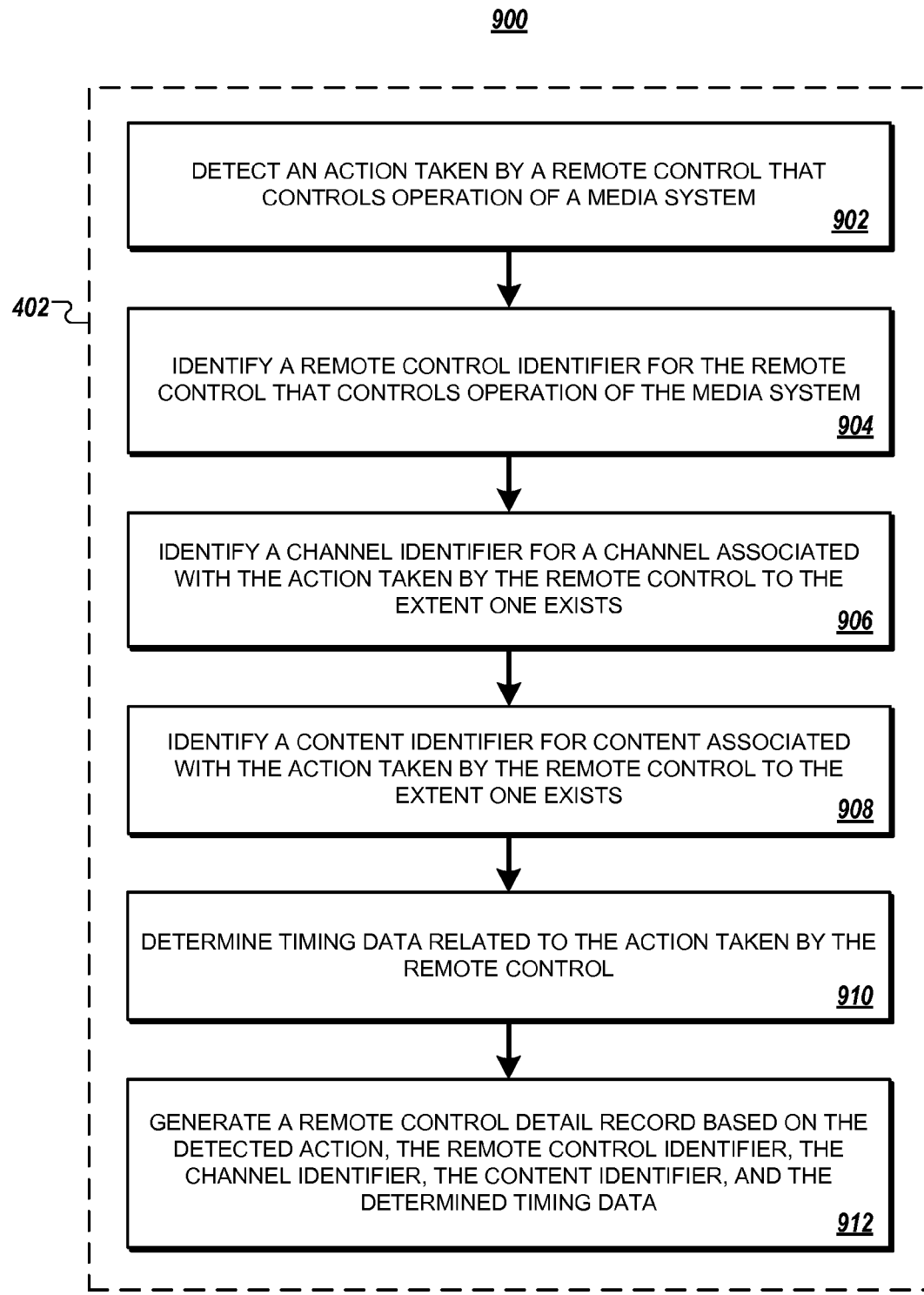

FIG. 9 illustrates a process 900 for generating a RDR. The process 900 may be used in monitoring remote control activity of a media system referenced above with respect to reference numeral 402. The operations of the process 900 are described generally as being performed by the system 200. The operations of the process 900 may be performed by one of the components of the system 200 (e.g., the server system 210) or may be performed by a combination of the components of the system 200. In some implementations, operations of the process 900 may be performed by one or more processors included in one or more electronic devices.

The system 200 detects an action taken by a remote control that controls operation of a media system (902). For example, a user may select a button on the remote control, such as a play button, stop button, rewind button, fast forward button, genre-up button, genre-down button, channel-up button, channel-down button, or call button.

The system 200 identifies a remote control identifier for the remote control that controls operation of the media system (904). For example, a remote control identifier may be retrieved from electronic storage of the remote control. As another example, a remote control identifier may be retrieved from a database external to the remote control.

The system 200 identifies a channel identifier for a channel associated with the action taken by the remote control to the extent one exists (906). For example, some, but not all, remote control actions correspond to a channel. For example, actions which have an associated channel identifier may include play, stop, fast-forward, rewind, channel-up, channel-down and switch-to-channel. Actions which do not relate to a channel include, for example, genre-up, genre-down, and place call. A channel identifier may be identified based on a current channel number (e.g., a content file acted on may be playing on a current channel). A channel identifier may be identified based on a channel number of a switched-to channel (e.g., based on a channel-up, channel-down, or switch-to-channel action).

The system 200 identifies a content identifier for content associated with the action taken by the remote control to the extent one exists (908). For example, some, but not all, remote control actions correspond to a content file. For example, actions which have an associated content identifier may include play, stop, fast-forward, and rewind. Actions which do not relate to a content file include, for example, genre-up, genre-down, place call, channel-up, and channel-down. A content identifier for an acted-on content file may be identified, for example, by the remote control and/or by the media player/downloader device.

The system 200 determines timing data related to the action taken by the remote control (910). For example, a timestamp may be recorded when an action is performed using the remote control.

The system 200 generates a remote control detail record based on the detected action, the remote control identifier, the channel identifier, the content identifier, and the determined timing data (912). FIG. 10 illustrates an example table 1000 of example RDRs 1002, 1004, 1006, 1008, 1010, 1012, 1014, and 1016. Each RDR 1002, 1004, 1006, 1008, 1010, 1012, 1014, and 1016 may include, for example, the following fields: a remote control identifier 1018, a channel identifier 1020, a content identifier 1022, an action indicator 1024, a start time 1026, and an end time 1028 (for some RDRs, some of the fields 1018, 1020, 1022, 1024, 1026, and 1028 may be empty, or NULL).

The RDR 1002 indicates that a remote control with identifier "234567" initiated a play action of a content file with identifier "654123" on a channel number one at time 1:03:13 on June twenty second. The RDR 1004 indicates that playback of the same content file was stopped at time 1:03:29 using the same remote control. The RDR 1006 indicates that the same remote control was used to initiate a call at time 1:04:14 on June twenty second, and that the call ended at time 1:04:19.

The RDR 1008 indicates that a user logged into a remote control with identifier "234563" on June twenty second at time 1:05:11. The RDR 1010 indicates that a user used the same remote control to browse content items on a channel number two, starting at time 1:05:11 on June twenty second and ending at time 1:05:21. The RDR 1012 indicates that the same remote control was used to view preview content for a content file with identifier "654135", starting at time 1:05:21 on June twenty second and ending at time 1:05:22. The RDR 1014 indicates that the same remote control was used to fast forward the content file beginning at time 1:05:22 on June twenty second and ending at time 1:05:23. The RDR 1016 indicates that the same remote control was used to browse genres, starting at time 1:05:25 on June twenty second, and ending at time 1:05:28.

Returning to FIG. 4, the system tracks data descriptive of use of the media system based on the monitoring (404). For example, content playing activity may be stored in one or more PDRs, content download activity may be stored in one or more DDRs, and remote control activity may be stored in one or more RDRs. For example and in reference to FIG. 3, one or more PDRs 304, DDRs 306, and RDRs 308 may be stored in the end user database 302. The PDR 304 may include information such as the information illustrated in the PDR 800 (FIG. 8), the DDR 306 may include information such as the information illustrated in the DDR 600 (FIG. 6), and the RDR 308 may include information such as the information illustrated in the RDR 1000 (FIG. 10).

The system performs one or more operations related to at least one of the media system and the content delivery network based on the tracked data descriptive of use of the media system (406). Performing one or more operations based on the tracked data is described in more detail below with respect to FIGS. 11 to 18.

Figure 11:
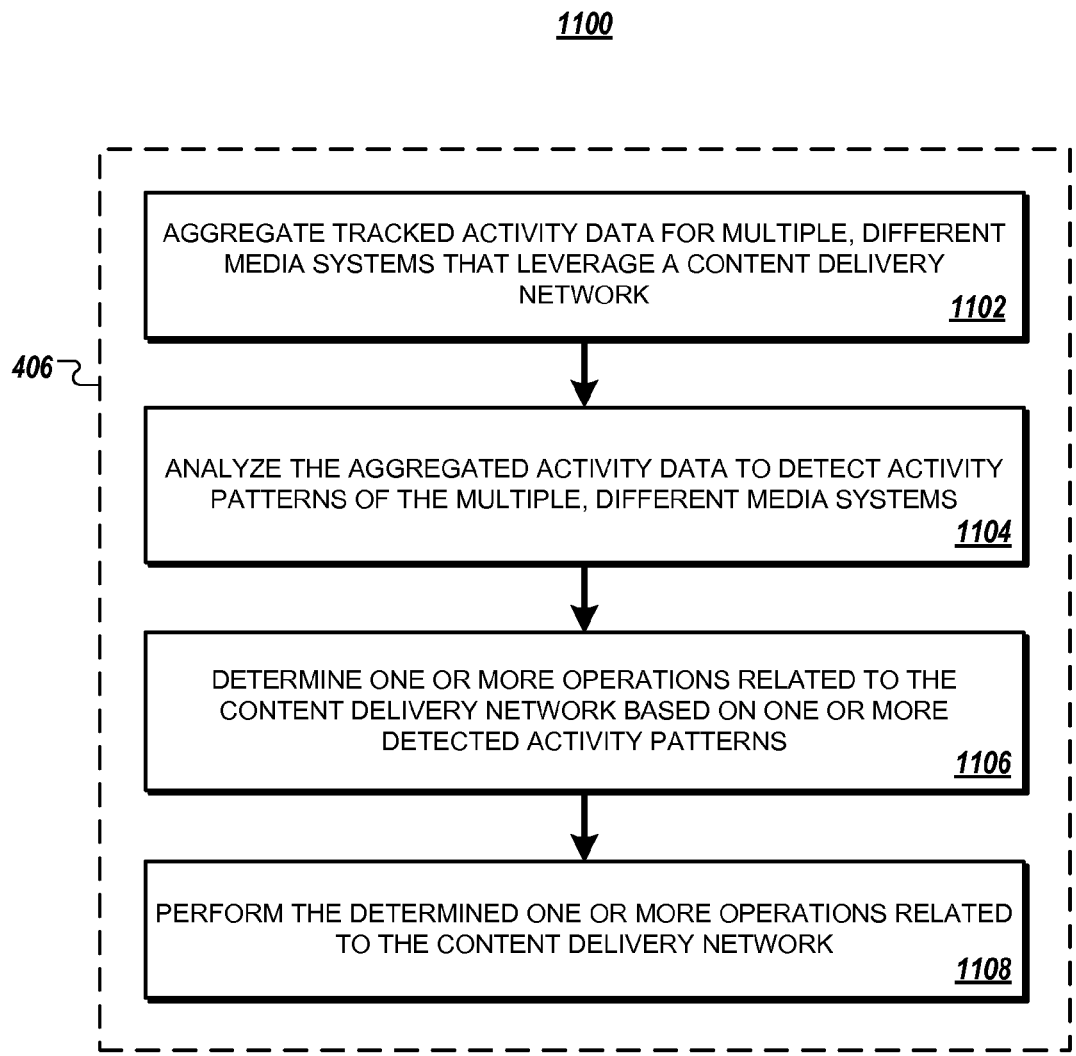

FIG. 11 illustrates a process 1100 for performing operations based on tracked data descriptive of use of a media system. The process 1100 may be used in performing operations based on tracked data descriptive of use of a media system referenced above with respect to reference numeral 406. The operations of the process 1100 are described generally as being performed by the system 200. The operations of the process 1100 may be performed by one of the components of the system 200 (e.g., the server system 210) or may be performed by a combination of the components of the system 200. In some implementations, operations of the process 1100 may be performed by one or more processors included in one or more electronic devices.

The system 200 aggregates tracked activity data for multiple, different media systems that leverage a content delivery network (1102). For example and in reference to FIG. 3, the end user database 302 may be queried for tracked activity data for multiple media systems (e.g., media player device 310) that leverage the content delivery network 318. Tracked activity data may include, for example, content download activity, content playing activity, and remote control activity.

Figure 12:
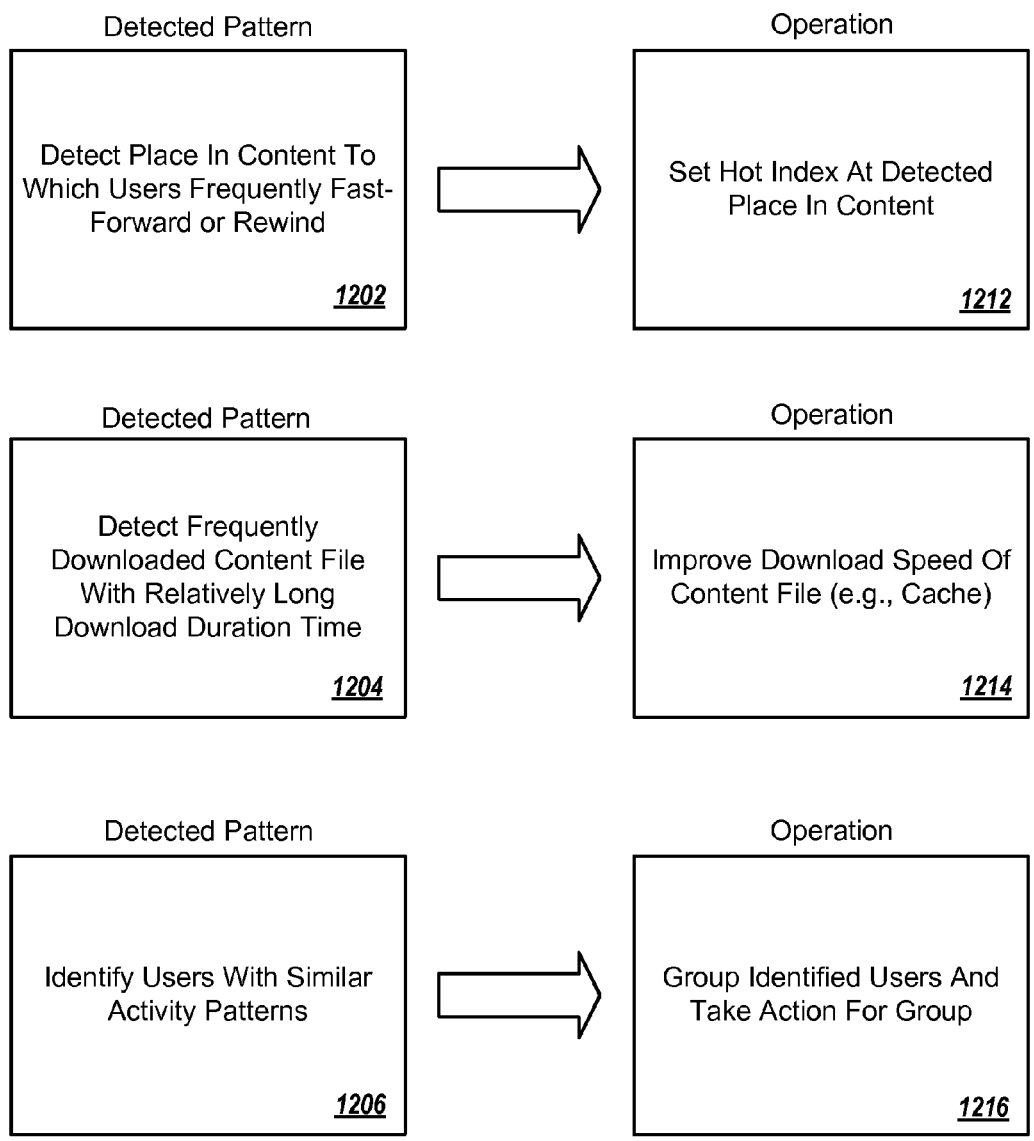
FIGS. 12, 14, and 16 are diagrams illustrating detected activity patterns and associated operations.

The system 200 analyzes the aggregated activity data to detect activity patterns of the multiple, different media systems (1104). For example, FIG. 12 illustrates example detected activity patterns 1202, 1204, and 1206. The pattern 1202 corresponds to detecting, based on monitoring activity patterns of multiple users, a place in a content file to which users frequently fast-forward or rewind. The pattern 1204 corresponds to detecting, based on monitoring multiple downloads of multiple content files by multiple users, a frequently downloaded content file with a relatively long download duration time. The pattern 1206 corresponds to identifying multiple users with similar activity patterns. For example, groups of users may be identified, where each user in a group subscribes to the same set or to a similar set of channels and/or plays the same or similar content files.

Returning to FIG. 11, the system 200 determines one or more operations related to the content delivery network based on one or more detected activity patterns (1106). For instance, in the example of FIG. 12, an operation 1212 may be determined based on the pattern 1202, an operation 1214 may be determined based on the pattern 1204, and an operation 1216 may be determined based on the pattern 1206. The operation 1212 corresponds to setting a hot index at the place in content detected in the pattern 1202 (e.g., the place in content to which users frequently fast-forward or rewind).

The operation 1214 corresponds to improving download speed of the frequently downloaded content file with relatively long download duration time detected in the pattern 1204. For example, the content file may be cached, such as to one or more proxy caches associated with one or more network service providers. As another example, the content file may be compressed, or further compressed, to decrease the size of the content file and to decrease the download duration time.

The operation 1216 corresponds to grouping the identified users with similar activity patterns and taking action for the group. For example, users with similar activity patterns may be grouped into a social network. If one or more users of the group subscribe to a new channel or download a new content file, the new channel or new content file may be suggested to all members of the group.

Returning to FIG. 11, the system 200 performs the determined one or more operations related to the content delivery network (1108). For instance, in the example of FIG. 12, the operation 1212 may be performed (e.g., setting a hot index at the detected place in content), the operation 1214 may be performed (e.g., caching or compressing the frequently downloaded content file), and the operation 1216 may be performed (e.g., grouping users with similar activity patterns into a social network and suggesting content to group members based on new content identified by one or more individual group members). In these examples, the operations impact multiple users/media systems included in the content delivery network.

Figure 13:
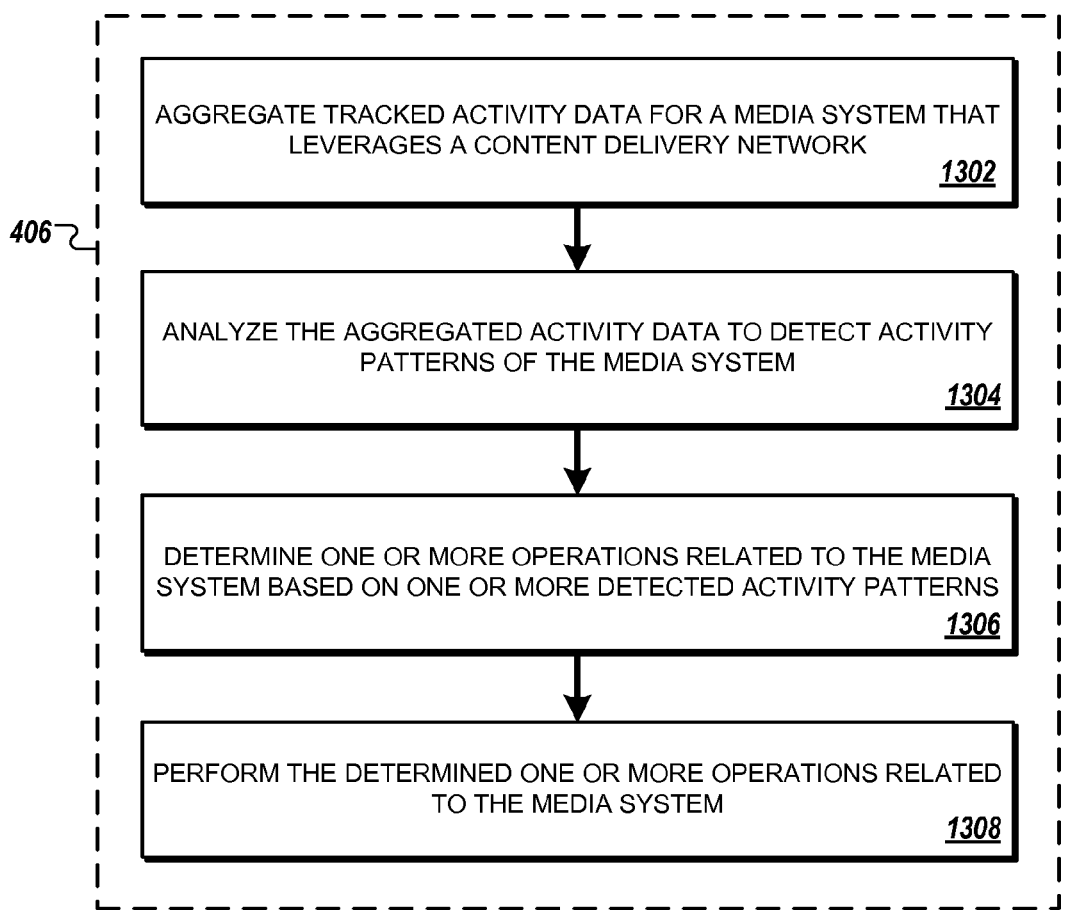

FIG. 13 illustrates a process 1300 for performing operations based on tracked data descriptive of use of a media system. The process 1300 may be used in performing operations based on tracked data descriptive of use of a media system referenced above with respect to reference numeral 406. The operations of the process 1300 are described generally as being performed by the system 200. The operations of the process 1300 may be performed by one of the components of the system 200 (e.g., the server system 210) or may be performed by a combination of the components of the system 200. In some implementations, operations of the process 1300 may be performed by one or more processors included in one or more electronic devices.

The system 200 aggregates tracked activity data for a media system that leverages a content delivery network (1302). For example and in reference to FIG. 3, the end user database 302 may be queried for tracked activity data for the media player device 310. Tracked activity data may include, for example, content download activity performed using the downloader device 312, content playing activity performed using the media player device 310, and remote control activity performed using the remote control device 314.

Figure 14:
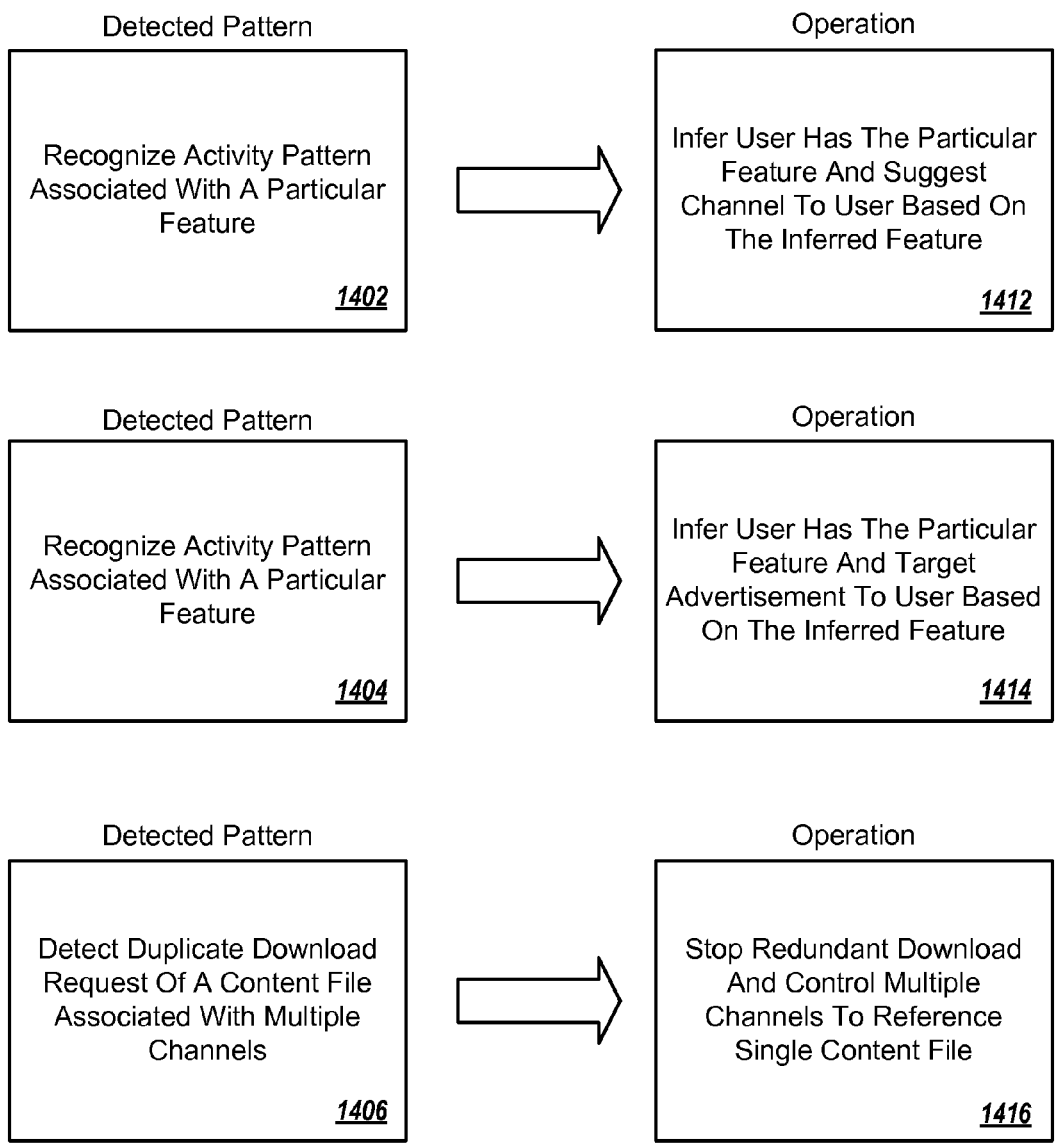

The system 200 analyzes the aggregated activity data to detect activity patterns of the media system (1304). For example, FIG. 14 illustrates example detected activity patterns 1402, 1404, and 1406. The patterns 1402 and 1404 correspond to recognizing an activity pattern of the user of the media system associated with a particular feature. For example, a user may have activity patterns which indicate that the user has an interest in sports, that the user has children, that the user owns their home, that the user lives in a particular region, or that some other interest or demographic characteristic applies to the user. For example, a pattern of subscribing to children-oriented channels and/or watching children-oriented content files may be associated with a user having children.

The pattern 1406 corresponds to detecting duplicate download requests of a content file associated with multiple channels. For example, one content file may be added to two or more different channels. A first download request may be associated with the inclusion of the content file in a first channel and a second download request may be associated with the inclusion of the content file in a second channel.

Returning to FIG. 13, the system 200 determines one or more operations related to the media system based on one or more detected activity patterns (1306). For instance, in the example of FIG. 14, an operation 1412 may be determined based on the pattern 1402, an operation 1414 may be determined based on the pattern 1404, and an operation 1416 may be determined based on the pattern 1406. The operations 1412 and 1414 correspond to inferring that the user has the feature associated with the activity pattern recognized in patterns 1402 and 1404, respectively (e.g., inferring that the user has children, that the user is interested in sports, that the user lives in a particular region).

The operation 1412 includes suggesting a channel to a user based on the inferred feature. For example, a children's programming channel, sports channel, or regional channel may be suggested to the user. The operation 1414 includes targeting an advertisement to the user based on the inferred feature. For example, an advertisement for children's' products, sports equipment or a regional establishment may be targeted to the user.

The operation 1416 corresponds to stopping redundant download of the content file associated with multiple channels (e.g., to avoid downloading multiple copies of the content file to the same media player/downloader device). For example, the content file may be downloaded once and multiple channels may be controlled to reference the single content file. A reference count may be maintained to represent the number of channels associated with the content file. In some implementations, the reference count may be decremented when the content file is watched on a particular channel, and the content file may be marked as available for deletion if the reference count reaches zero.

Returning to FIG. 13, the system 200 performs the determined one or more operations related to the media system (1308). For instance, in the example of FIG. 14, the operation 1412 may be performed (e.g., suggesting a channel to a user based on an inferred feature), the operation 1414 may be performed (e.g., targeting an advertisement to a user based on an inferred feature), and the operation 1416 may be performed (e.g., stopping redundant download of a content file associated with multiple channels and controlling the multiple channels to reference a single content file).

Figure 15:
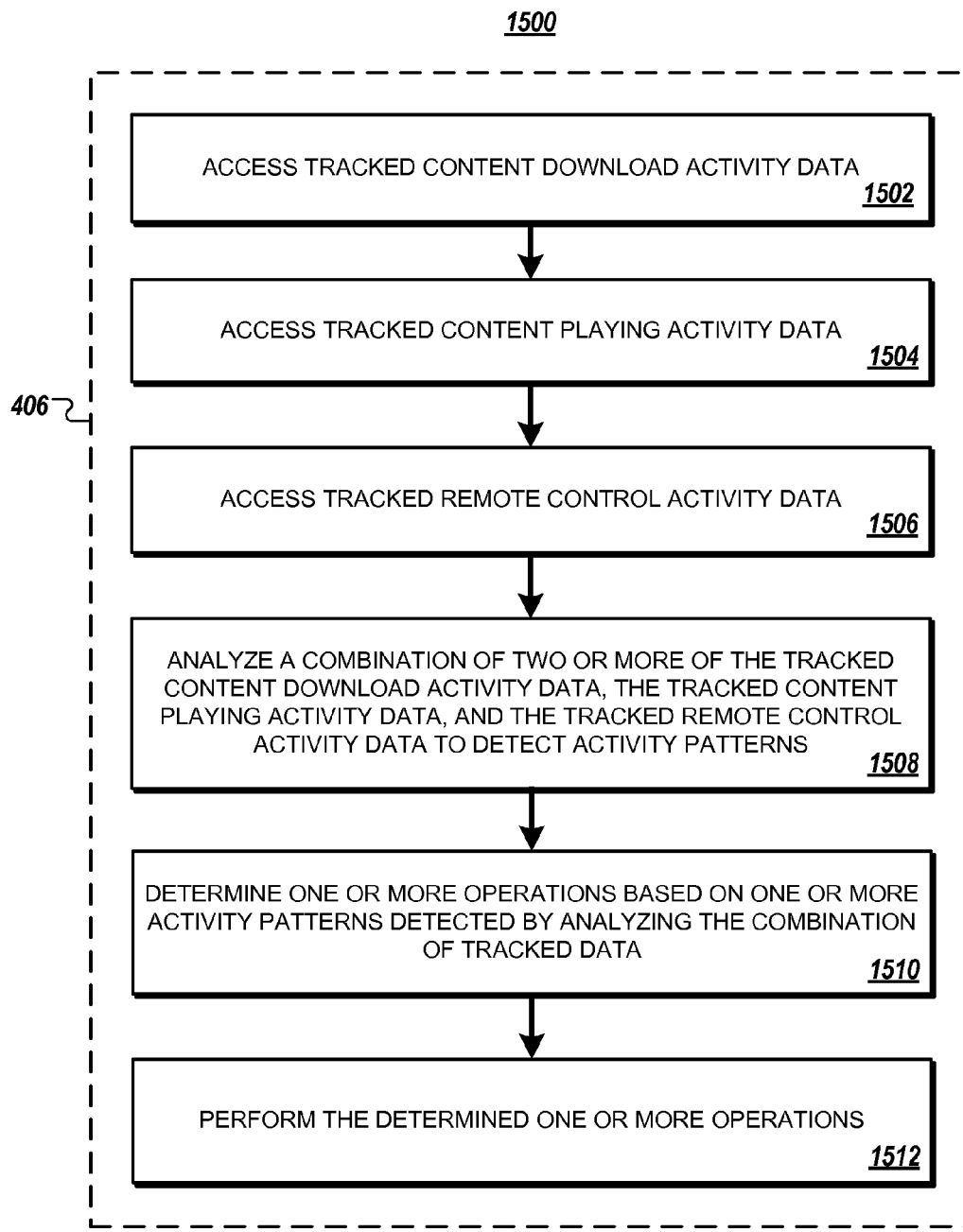

FIG. 15 illustrates a process 1500 for performing operations based on tracked data descriptive of use of a media system. The process 1500 may be used in performing operations based on tracked data descriptive of use of a media system referenced above with respect to reference numeral 406. The operations of the process 1500 are described generally as being performed by the system 200. The operations of the process 1500 may be performed by one of the components of the system 200 (e.g., the server system 210) or may be performed by a combination of the components of the system 200. In some implementations, operations of the process 1500 may be performed by one or more processors included in one or more electronic devices.

The system 200 accesses tracked content download activity data (1502). For example and in reference to FIG. 3, one or more DDRs 306 may be accessed from the end user database 302.

The system 200 accesses tracked content playing activity data (1504). For example and in reference to FIG. 3, one or more PDRs 304 may be accessed from the end user database 302.

The system 200 accesses tracked remote control activity data (1506). For example and in reference to FIG. 3, one or more RDRs 308 may be accessed from the end user database 302.

Figure 16:
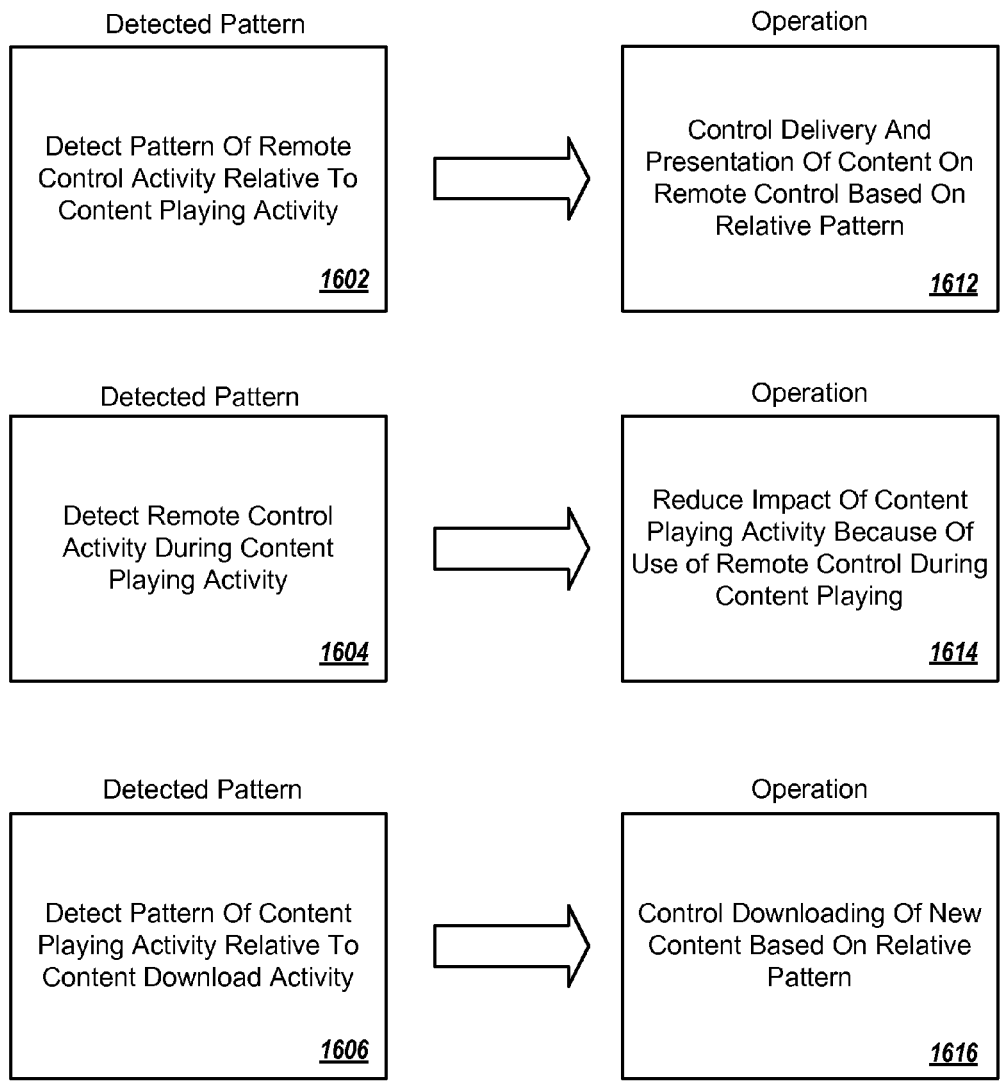

The system 200 analyzes a combination of two or more of the tracked content download activity data, the tracked content playing activity data, and the tracked remote control activity data to detect activity patterns (1508). For example and as illustrated in FIG. 16, a pattern 1602 of remote control activity relative to content playing activity may be detected. As another example, a pattern 1604 of remote control activity during content playing activity may be detected. As yet another example, a pattern 1606 of content playing activity relative to content download activity may be detected. Other patterns may be possible, such as a pattern relating remote control activity to content download activity, or to a pattern relating content playing activity, content download activity, and remote control activity.

The pattern 1602 may include, for example, detecting that a user typically uses a remote control after a certain amount of time has passed since starting content playback. For example, it may be detected that a user typically uses the remote control one minute or ten minutes after starting content playback. As another example, the pattern 1602 may include detecting that a user often browses preview content of upcoming content on a channel while watching a currently-playing content item on a channel. The pattern 1604 may include, for example, detecting an amount of remote control activity that a user performs while watching content. The pattern 1606 may include, for example, detecting a pattern of how soon a user watches a content file after a content file is downloaded. For example, some users may typically watch a content file within one day of when the content file is downloaded and other users may typically watch a content file, on average, ten days after a content file is downloaded.

The system 200 determines one or more operations based on one or more activity patterns detected by analyzing the combination of tracked data (1510). For instance, in the example of FIG. 16, an operation 1612 may be determined based on the pattern 1602, an operation 1614 may be determined based on the pattern 1604, and an operation 1616 may be determined based on the pattern 1606. The operation 1612 corresponds to controlling delivery and presentation of content on the remote control based on the detected pattern 1602 of remote control activity relative to content playing activity. For example, the operation 1612 may include targeting advertisements to a user for display on the remote control at a time when the user typically uses the remote control. As another example, the operation 1612 may include preloading preview content onto a remote control for channels for which the user typically views preview content.

The operation 1614 may include, for example, decreasing a weighting of a user's watching of content if the user is performing an amount of remote control activity above a threshold while viewing the content. For example, a weighting used to determine an amount to charge for advertising played during the playing of the content may be decreased if the user's remote control activity indicates that the user may not have been paying attention to the content. The operation 1616 may include, for example, prioritizing download of content to users who typically view content shortly after content is downloaded, and assigning a lesser priority to download of content to users who typically wait for a longer time before watching downloaded content.

Returning to FIG. 15, the system 200 performs the determined one or more operations (1512). For instance, in the example of FIG. 16, the operation 1612 may be performed (e.g., controlling delivery and presentation of content based on a pattern of remote control activity relative to content playing activity), the operation 1614 may be performed (e.g., reducing impact of content playing activity because of use of the remote control during content playing), and the operation 1616 may be performed (e.g., controlling download of new content based on a detected pattern of content playing activity relative to content download activity).

Figure 17:
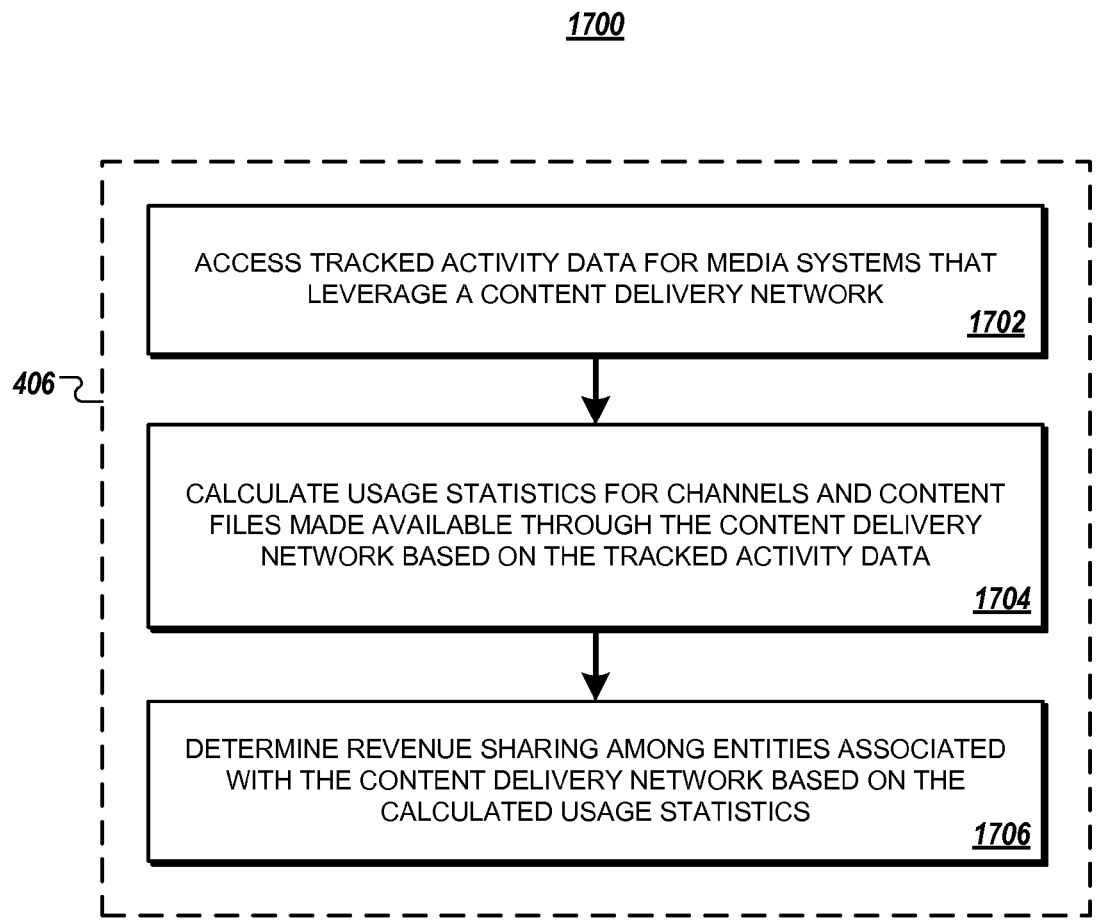

FIG. 17 illustrates a process 1700 for performing operations based on tracked data descriptive of use of a media system. The process 1700 may be used in performing operations based on tracked data descriptive of use of a media system referenced above with respect to reference numeral 406. The operations of the process 1700 are described generally as being performed by the system 200. The operations of the process 1700 may be performed by one of the components of the system 200 (e.g., the server system 210) or may be performed by a combination of the components of the system 200. In some implementations, operations of the process 1700 may be performed by one or more processors included in one or more electronic devices.

The system 200 accesses tracked activity data for media systems that leverage a content delivery network (1702). For example and in reference to FIG. 3, the end user database 302 may be queried for tracked activity data for multiple media systems (e.g., media player device 310) that leverage the content delivery network 318. Tracked activity data may include, for example, content download activity, content playing activity, and remote control activity. The content download activity, the content playing activity, and the remote control activity may relate to entertainment content that a user experiences for entertainment purposes and/or may relate to advertisement content. When the content download activity, the content playing activity, and the remote control activity relates to advertisement content, the system 200 tracks when and which advertisements are downloaded and played, and tracks remote control activity related to the advertisement content.

The system 200 calculates usage statistics for channels and content files made available through the content delivery network based on the tracked activity data (1704). For example, the system 200 may determine how many times a content file has been watched (e.g., in general, or by users living in a particular geographic region), the number of subscribers for a channel (e.g., in general, or users living in a particular geographic region), or how many times a channel has been watched. Usage statistics may be calculated, for example, based on the tracked content download activity, content playing activity, and remote control activity. The system 200 also may track usage statistics for advertisement content files. For instance, the system 200 may track statistics on which existing advertisements are played how many times, paused, rewound, etc. The system 200 may use the usage statistics for advertisement content files for the purpose of determining which future advertisements to push to the user.

Figure 18:
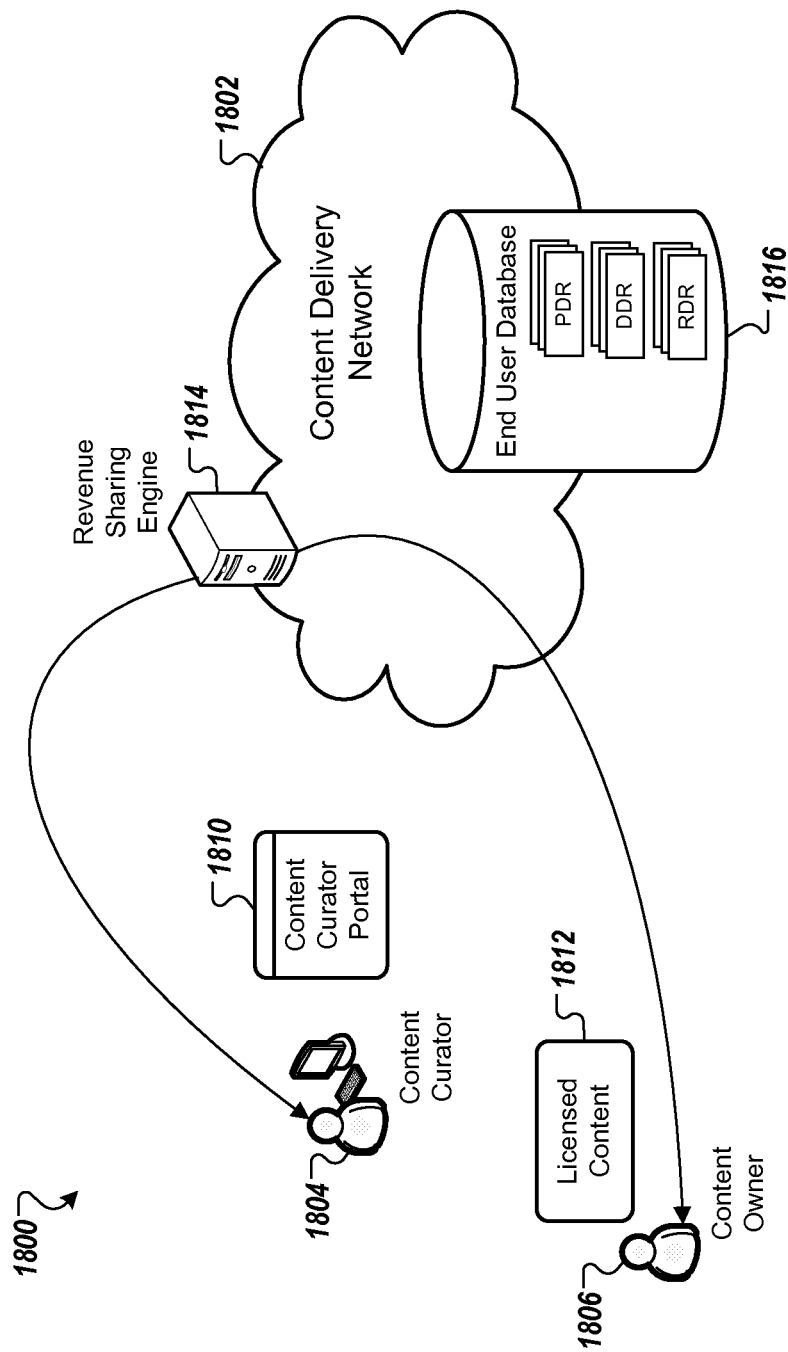

The system 200 determines revenue sharing among entities associated with the content delivery network based on the calculated usage statistics (1706). For example, FIG. 18 illustrates a system 1800 which includes a content delivery network 1802. A content curator 1804 and a content owner 1806 are associated with the content delivery network 1802. The content curator 1804 may define one or more channels using a content curator portal 1810 and the content owner 1806 may make one or more licensed content items 1812 available over the content delivery network 1802.

A revenue sharing engine 1814 may calculate revenue sharing among the content curator 1804, the content owner 1806, and the owner of the content delivery network 1802. The revenue sharing engine 1814 may determine revenue sharing based on usage statistics calculated based on activity data accessed from an end user database 1816. For example, based on usage statistics calculated from data from DDRs and PDRs from the end user database 1816, thirty percent of generated revenue may be allocated for the content curator 1804, thirty percent for the content owner 1806, and forty percent for the owner of the content delivery network 1802.

Figure 19:
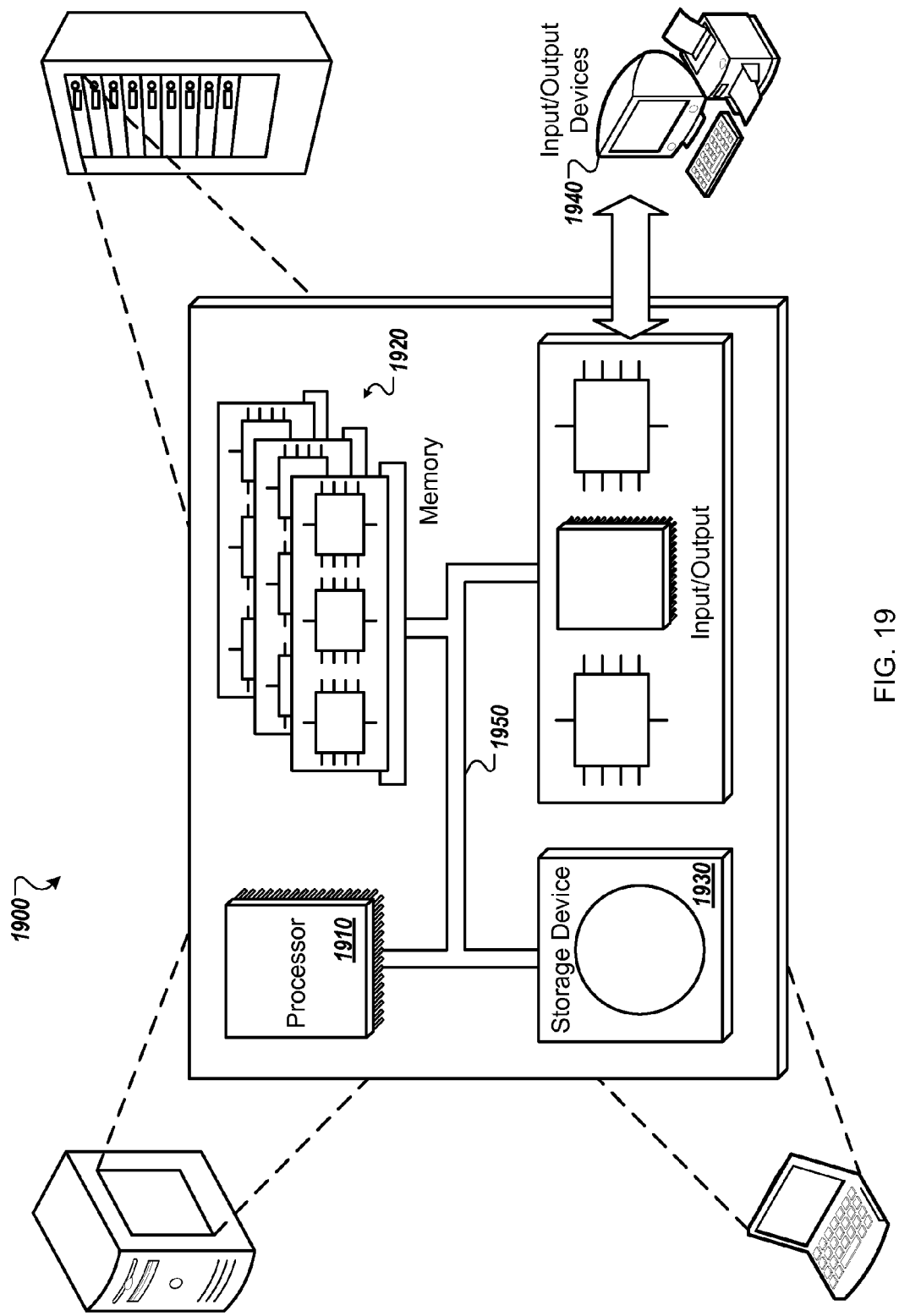

FIG. 19 is a schematic diagram of an example of a generic computer system 1900. The system 1900 can be used for the operations described in association with the processes 400, 500, 700, 900, 1100, 1300, 1500, and 1700 according to one implementation. For example, the system 1900 may be included in either or all of the server system 210, the server 208, the platform 316, and the engine 1814.

The system 1900 includes a processor 1910, a memory 1920, a storage device 1930, and an input/output device 1940. Each of the components 1910, 1920, 1930, and 1940 are interconnected using a system bus 1950. The processor 1910 is capable of processing instructions for execution within the system 1900. In one implementation, the processor 1910 is a single-threaded processor. In another implementation, the processor 1910 is a multi-threaded processor. The processor 1910 is capable of processing instructions stored in the memory 1920 or on the storage device 1930 to display graphical information for a user interface on the input/output device 1940.

The memory 1920 stores information within the system 1900. In one implementation, the memory 1920 is a computer-readable medium. In one implementation, the memory 1920 is a volatile memory unit. In another implementation, the memory 1920 is a non-volatile memory unit.

The storage device 1930 is capable of providing mass storage for the system 1900. In one implementation, the storage device 1930 is a computer-readable medium. In various different implementations, the storage device 1930 may be a floppy disk device, a hard disk device, an optical disk device, or a tape device.

The input/output device 1940 provides input/output operations for the system 1900. In one implementation, the input/output device 1940 includes a keyboard and/or pointing device. In another implementation, the input/output device 1940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    monitoring content playing activity of a media system that leverages a content delivery network in controlling content delivered to the media system, the monitoring of content playing activity comprising monitoring commands controlling playing of content by the media system and timing data associated with the commands;
    identifying trends in the content playing activity of the media system based on the monitoring of the content playing activity that includes the commands controlling playing of content by the media system and the timing data associated with the commands; and
    performing, by a device, one or more operations related to at least one of the media system and the content delivery network based on the identified trends in the content playing activity of the media system,
    wherein identifying trends in the content playing activity of the media system based on the monitoring of the content playing activity that includes the commands controlling playing of content by the media system and the timing data associated with the commands comprises detecting, based on the monitoring of the content playing activity that includes the commands controlling playing of content by the media system and the timing data associated with the commands, a place in a content file to which users frequently fast-forward or rewind; and
    wherein performing one or more operations related to at least one of the media system and the content delivery network based on the identified trends in the content playing activity of the media system comprises setting a hot index at the place in the content file to which users frequently fast-forward or rewind.

2. The method of claim 1:
    wherein monitoring content playing activity of the media system comprises:
        identifying a content identifier of a content file being played by a media player included in the media system;
        identifying a media player identifier for the media player included in the media system;
        generating a play detail record based on the content identifier, the media player identifier, and the monitored commands and timing data; and
        storing the play detail record.

3. The method of claim 2 wherein identifying the content identifier of the content file being played by the media player included in the media system comprises:
    determining a digital fingerprint of the content file being played by the media player; and
    using the digital fingerprint to determine the content identifier of the content file.

4. The method of claim 1 wherein performing one or more operations related to at least one of the media system and the content delivery network based on the identified trends in the content playing activity of the media system comprises:
    aggregating tracked content playing activity data for multiple, different media systems that leverage the content delivery network;
    analyzing the aggregated content playing activity data to detect content playing activity patterns of the multiple, different media systems;
    determining one or more operations related to the content delivery network based on one or more detected content playing activity patterns; and
    performing the determined one or more operations related to the content delivery network.

5. The method of claim 1 wherein performing one or more operations related to at least one of the media system and the content delivery network based on the identified trends in the content playing activity of the media system comprises:
    aggregating tracked content playing activity data for the media system that leverages the content delivery network;
    analyzing the aggregated content playing activity data to detect content playing activity patterns of the media system;
    determining one or more operations related to the media system based on one or more detected content playing activity patterns; and
    performing the determined one or more operations related to the media system.

6. The method of claim 5:
    wherein determining one or more operations related to the media system based on one or more detected content playing activity patterns comprises determining a channel to recommend to a user of the media system based on one or more detected content playing activity patterns; and wherein performing the determined one or more operations related to the media system comprises recommending the channel to the user of the media system.

7. The method of claim 5:

wherein determining one or more operations related to the media system based on one or more detected content playing activity patterns comprises determining an advertisement to provide to a user of the media system based on one or more detected content playing activity patterns; and wherein performing the determined one or more operations related to the media system comprises providing the advertisement to the user of the media system.

8. The method of claim 1 wherein performing one or more operations related to at least one of the media system and the content delivery network based on the identified trends in the content playing activity of the media system comprises:

accessing tracked content download activity data;
accessing tracked content playing activity data;
accessing tracked remote control activity data;
analyzing a combination of the tracked content download activity data, the tracked content playing activity data, and the tracked remote control activity data to detect activity patterns;
determining one or more operations based on one or more activity patterns detected by analyzing the combination of tracked data; and
performing the determined one or more operations.

9. The method of claim 1 wherein performing one or more operations related to at least one of the media system and the content delivery network based on the identified trends in the content playing activity of the media system comprises:

accessing tracked content download activity data;
accessing tracked content playing activity data;
analyzing a combination of the tracked content download activity data and the tracked content playing activity data to detect activity patterns;
determining one or more operations based on one or more activity patterns detected by analyzing the combination of tracked data; and
performing the determined one or more operations.

10. The method of claim 1 wherein performing one or more operations related to at least one of the media system and the content delivery network based on the identified trends in the content playing activity of the media system comprises:

accessing tracked content playing activity data;
accessing tracked remote control activity data;
analyzing a combination of the tracked content playing activity data and the tracked remote control activity data to detect activity patterns;
determining one or more operations based on one or more activity patterns detected by analyzing the combination of tracked data; and
performing the determined one or more operations.

11. The method of claim 1 wherein performing one or more operations related to at least one of the media system and the content delivery network based on the identified trends in the content playing activity of the media system comprises performing one or more operations related to the media system based on the identified trends in the content playing activity of the media system.

12. The method of claim 1 wherein performing one or more operations related to at least one of the media system and the content delivery network based on the identified trends in the content playing activity of the media system comprises performing one or more operations related to the content delivery network based on the identified trends in the content playing activity of the media system.

13. The method of claim 1:

wherein monitoring, content playing activity of a media system comprises monitoring advertisement content playing activity;

wherein identifying trends in the content playing activity of the media system based on the monitoring of the content playing activity comprises identifying trends in the advertisement content playing activity of the media system based on the advertisement content playing activity; and wherein performing one or more operations related to at least one of the media system and the content delivery network based on the identified trends in the content playing activity of the media system comprises identifying advertisements to provide to the media system based on the identified trends in the advertisement content playing activity of the media system.

14. The method of claim 1, further comprising:

monitoring remote control activity of the media system in controlling content delivered to the media system, the monitoring of remote control activity comprising monitoring actions taken by a remote control that controls operation of the media system and timing data associated with the actions;

identifying trends in the remote control activity of the media system based on the monitoring of the remote control activity that includes the actions taken by the remote control that controls operation of the media system and the timing data associated with the actions; and performing one or more operations related to at least one of the media system and the content delivery network based on the identified trends in the remote control activity of the media system.

15. The method of claim 14:

wherein monitoring remote control activity of the media system comprises:

detecting an action taken by the remote control that controls operation of the media system;
identifying a remote control identifier for the remote control that controls operation of the media system;
determining timing data related to the action taken by the remote control;
generating a remote control detail record based on the detected action, the remote control identifier, and the determined timing data; and
storing the remote control detail record.

16. The method of claim 15:

wherein monitoring remote control activity of the media system further comprises identifying a channel identifier for a channel associated with the action taken by the remote control; and wherein generating the remote control detail record comprises generating a remote control detail record based on the detected action, the remote control identifier, the channel identifier, and the determined timing data.

17. The method of claim 15:

wherein monitoring remote control activity of the media system further comprises identifying a content identifier for content associated with the action taken by the remote control; and wherein generating the remote control detail record comprises generating a remote control detail record based on the detected action, the remote control identifier, the content identifier, and the determined timing data.

18. The method of claim 1:
wherein identifying trends in the content playing activity of the media system based on the monitoring of the content playing activity that includes the commands controlling playing of content by the media system and the timing data associated with the commands comprises identifying a group of users that play the same or similar content files; and
wherein performing one or more operations related to at least one of the media system and the content delivery network based on the identified trends in the content playing activity of the media system comprises grouping the identified users that play the same or similar content files and, based on detecting one or more users of the group subscribing to a new channel or downloading a new content file, suggesting the new channel or new content file to all members of the group.

19. The method of claim 1:
wherein identifying trends in the content playing activity of the media system based on the monitoring of the content playing activity that includes the commands controlling playing of content by the media system and the timing data associated with the commands comprises detecting a pattern of remote control activity during content playing activity; and
wherein performing one or more operations related to at least one of the media system and the content delivery network based on the identified trends in the content playing activity of the media system comprises decreasing a weighting related to a user watching content based on the pattern of remote control activity during content playing activity indicating an amount of remote control activity above a threshold while viewing content.

20. The method of claim 1, further comprising:
accessing tracked activity data for media systems that leverage the content delivery network;
calculating usage statistics for channels and content files made available through the content delivery network based on the tracked activity data; and
determining revenue sharing among entities associated with the content delivery network based on the calculated usage statistics.

21. A system comprising:
at least one computer; and
at least one computer-readable medium coupled to the at least one computer having instructions stored thereon which, when executed by the at least one computer, causes the at least one computer to perform operations comprising:
monitoring content playing activity of a media system that leverages a content delivery network in controlling content delivered to the media system, the monitoring of content playing activity comprising monitoring commands controlling playing of content by the media system and timing data associated with the commands;
identifying trends in the content playing activity of the media system based on the monitoring of the content playing activity that includes the commands controlling playing of content by the media system and the timing data associated with the commands; and
performing, using the at least one computer, one or more operations related to at least one of the media system and the content delivery network based on the identified trends in the content playing activity of the media system,
wherein identifying trends in the content playing activity of the media system based on the monitoring of the content playing activity that includes the commands controlling playing of content by the media system and the timing data associated with the commands comprises detecting, based on the monitoring of the content playing activity that includes the commands controlling playing of content by the media system and the timing data associated with the commands, a place in a content file to which users frequently fast-forward or rewind; and
wherein performing one or more operations related to at least one of the media system and the content delivery network based on the identified trends in the content playing activity of the media system comprises setting a hot index at the place in the content file to which users frequently fast-forward or rewind.

22. At least one non-transitory computer-readable storage medium encoded with at least one computer program comprising instructions that, when executed, operate to cause a processor to perform operations comprising:
monitoring content playing activity of a media system that leverages a content delivery network in controlling content delivered to the media system, the monitoring of content playing activity comprising monitoring commands controlling playing of content by the media system and timing data associated with the commands;
identifying trends in the content playing activity of the media system based on the monitoring of the content playing activity that includes the commands controlling playing of content by the media system and the timing data associated with the commands; and
performing one or more operations related to at least one of the media system and the content delivery network based on the identified trends in the content playing activity of the media system,
wherein identifying trends in the content playing activity of the media system based on the monitoring of the content playing activity that includes the commands controlling playing of content by the media system and the timing data associated with the commands comprises detecting, based on the monitoring of the content playing activity that includes the commands controlling playing of content by the media system and the timing data associated with the commands, a place in a content file to which users frequently fast-forward or rewind; and
wherein performing one or more operations related to at least one of the media system and the content delivery network based on the identified trends in the content playing activity of the media system comprises setting a hot index at the place in the content file to which users frequently fast-forward or rewind.

* * * * *